(12) United States Patent
Mohen Venkatakrishnan et al.

(10) Patent No.: US 10,959,101 B2
(45) Date of Patent: Mar. 23, 2021

(54) CELL RESOURCE ALLOCATION

(71) Applicant: Accenture Global Solutions Limited, Dublin (IE)

(72) Inventors: Ram Mohen Mohen Venkatakrishnan, Karnataka (IN); Romesh Viswanath, Telangana (IN); Deepak A. Sharma, Karnataka (IN); Chandradeep Mallick, Karnataka (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/400,797

(22) Filed: May 1, 2019

(65) Prior Publication Data

US 2020/0351666 A1 Nov. 5, 2020

(51) Int. Cl.
*H04W 16/02* (2009.01)
*G06N 10/00* (2019.01)
(Continued)

(52) U.S. Cl.
CPC ............ *H04W 16/02* (2013.01); *G06N 10/00* (2019.01); *H04W 72/0453* (2013.01); *G06F 11/321* (2013.01); *G06F 11/324* (2013.01)

(58) Field of Classification Search
CPC ..... G06F 11/321; G06F 11/324; G06N 10/00; H04W 16/02; H04W 72/0453; H04W 16/10
See application file for complete search history.

(56) References Cited

U.S. PATENT DOCUMENTS 5,754,444 A 5/1998 Koford
9,736,700 B1 * 8/2017 Douberley ............ H04W 16/18
(Continued)

FOREIGN PATENT DOCUMENTS

CA 2915760 A1 6/2017
CN 108668283 A 10/2018
EP 3333771 A1 6/2018

OTHER PUBLICATIONS

Du Z., et al., "Data-Driven Deployment and Cooperative Self Organization in Ultra-Dense Small Cell Networks", IEEE Access, Apr. 13, 2018, vol. 6, pp. 22839-22848, XP011683735.
(Continued)

*Primary Examiner* — Luat Phung
*Assistant Examiner* — Kai Chang
(74) *Attorney, Agent, or Firm* — Harrity & Harrity, LLP

(57) ABSTRACT

A device may generate a hypergraph for a plurality of cells included in a communications network. The device may identify one or more parameters for allocating operating transmission frequencies to the plurality of cells. The plurality of cells may correspond to vertices of the hypergraph, and one or more cumulative transmission interference regions, associated with the plurality of cells, may correspond to hyperedges of the hypergraph. The device may generate a constraint model based on the hypergraph and the one or more parameters. The device may determine, using a quantum solver, one or more minimum energy states of the constraint model. The one or more minimum energy states may correspond to respective operating transmission frequency allocation configurations for the plurality of cells. The device may assign, based on a minimum energy state of the one or more minimum energy states, operating transmission frequencies to the plurality of cells.

20 Claims, 13 Drawing Sheets

(51) Int. Cl.
*H04W 72/04* (2009.01)
*G06F 11/32* (2006.01)

(56) References Cited

U.S. PATENT DOCUMENTS

| | | | | |
|---|---|---|---|---|
| 9,826,413 | B1* | 11/2017 | Abid | G07C 5/008 |
| 10,592,626 | B1* | 3/2020 | Pednault | G06F 30/392 |
| 10,705,861 | B1* | 7/2020 | Kincaid | G06F 9/451 |
| 2008/0116449 | A1* | 5/2008 | Macready | G06N 10/00 |
| | | | | 257/31 |
| 2009/0109868 | A1* | 4/2009 | Chen | H04L 41/12 |
| | | | | 370/254 |
| 2010/0008316 | A1 | 1/2010 | Liu et al. | |
| 2010/0085916 | A1* | 4/2010 | Yu | H04L 45/00 |
| | | | | 370/328 |
| 2010/0271989 | A1* | 10/2010 | Chernoguzov | G05B 19/41855 |
| | | | | 370/310 |
| 2012/0113942 | A1* | 5/2012 | Kim | H04L 1/1861 |
| | | | | 370/329 |
| 2012/0238279 | A1* | 9/2012 | Yu | H04W 52/244 |
| | | | | 455/449 |
| 2015/0063102 | A1* | 3/2015 | Mestery | H04L 41/12 |
| | | | | 370/230 |
| 2015/0350992 | A1* | 12/2015 | Han | H04W 36/26 |
| | | | | 370/331 |
| 2016/0171368 | A1* | 6/2016 | Aspuru-Guzik | G06N 10/00 |
| | | | | 706/46 |
| 2016/0338075 | A1 | 11/2016 | McKibben | |
| 2017/0055050 | A1* | 2/2017 | Cavaliere | H04J 14/0209 |
| 2017/0177544 | A1* | 6/2017 | Zaribafiyan | G06N 5/003 |
| 2017/0187488 | A1* | 6/2017 | Rico Alvarino | H04L 1/0041 |
| 2018/0060476 | A1* | 3/2018 | Kasch | G06F 30/392 |
| 2019/0007127 | A1* | 1/2019 | Ward | G06F 11/261 |
| 2019/0095799 | A1 | 3/2019 | Lidar et al. | |
| 2019/0286774 | A1* | 9/2019 | Nannicini | G06F 30/367 |

OTHER PUBLICATIONS

Extended European Search Report for Application No. EP20171971.3, dated Oct. 6, 2020, 24 pages.

Hongliang Z., et al., "Hypergraph Theory: Applications in 5G Heterogeneous Ultra-Dense Networks", arxiv.org, Cornell University, Sep. 21, 2017, 16 pages, XP080822267.

Zhang H., et al., "Hypergraph Theory: Applications in 5G Heterogeneous Ultra-Dense Networks", IEEE Communications Magazine, Dec. 1, 2017, vol. 55(12), pp. 70-76, XP011674429.

* cited by examiner

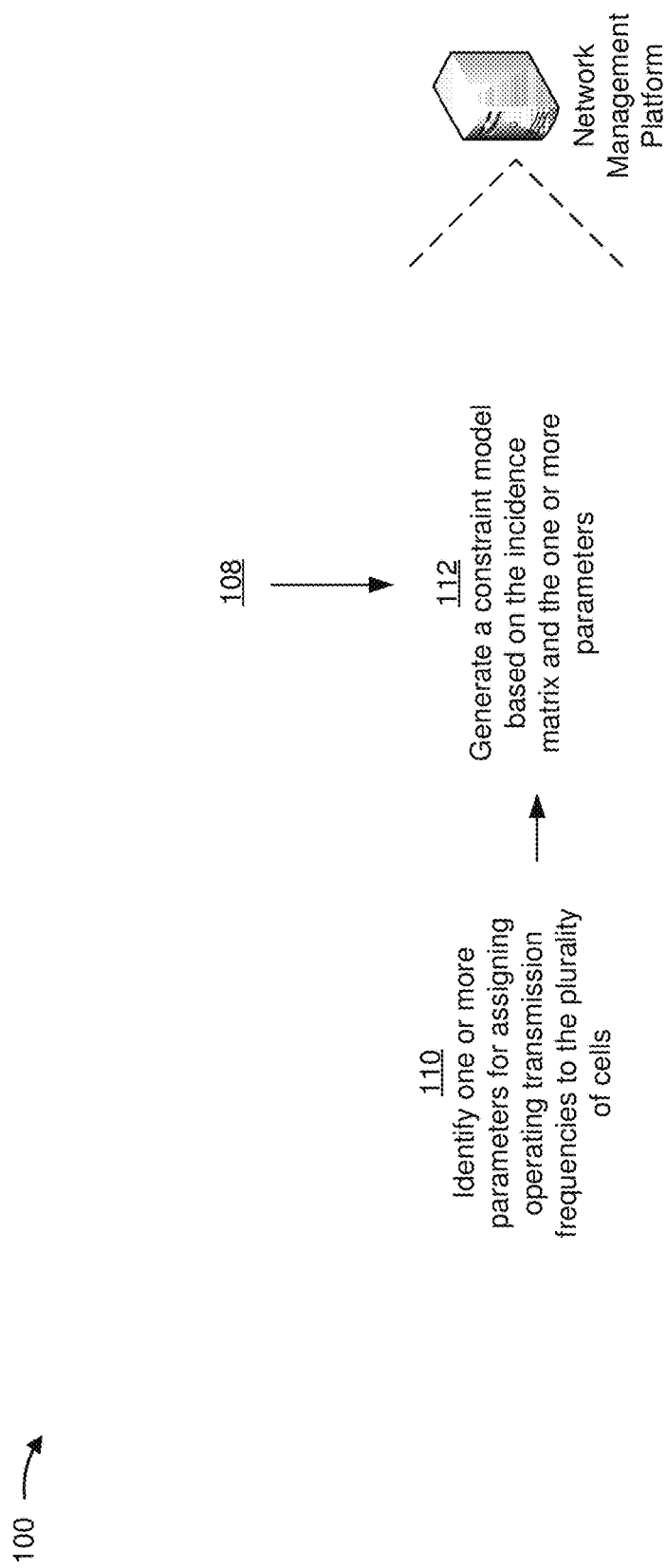

CELL RESOURCE ALLOCATION

BACKGROUND

Fifth generation (5G) New Radio (NR) communications networks may provide speed, responsiveness, and reach that may unlock the full capabilities of other technologies, such as self-driving cars, drones, virtual reality, Internet of things (IoT), and/or the like.

SUMMARY

According to some implementations, a device may include one or more memories, and one or more processors, communicatively coupled to the one or more memories, configured to generate a hypergraph for a plurality of cells included in a communications network, wherein the plurality of cells correspond to a plurality of vertices of the hypergraph, and wherein one or more cumulative transmission interference regions, associated with the plurality of cells, correspond to one or more hyperedges of the hypergraph; identify one or more parameters for allocating operating transmission frequencies to the plurality of cells; generate a constraint model based on the hypergraph and the one or more parameters; determine, using a quantum solver, one or more minimum energy states of the constraint model, wherein the one or more minimum energy states correspond to respective operating transmission frequency allocation configurations for the plurality of cells; and assign, based on an operating transmission frequency allocation configuration corresponding to a minimum energy state of the one or more minimum energy states, operating transmission frequencies to the plurality of cells.

According to some implementations, a method may include generating a hypergraph for a plurality of cells included in a communications network, wherein the plurality of cells correspond to a plurality of vertices of the hypergraph, and wherein one or more cumulative transmission interference regions, associated with the plurality of cells, correspond to one or more hyperedges of the hypergraph; identifying one or more parameters for assigning operating transmission frequencies to the plurality of cells; generating a constraint model based on the hypergraph and the one or more parameters; providing, via an application programming interface (API), the constraint model to a quantum solver; determining, using the quantum solver, a minimum energy state of the constraint model, wherein the minimum energy state corresponds to an operating transmission frequency allocation configuration for the plurality of cells, and wherein the minimum energy state includes a minimum quantity of operating transmission frequencies required to configure the plurality of cells such that no more than one cell included in a hyperedge, of the one or more hyperedges, is assigned a particular operating transmission frequency; and assigning operating transmission frequencies to the plurality of cells based on the operating transmission frequency allocation configuration corresponding to the minimum energy state.

According to some implementations, a non-transitory computer-readable medium may store one or more instructions. The one or more instructions, when executed by one or more processors of a device, may cause the one or more processors to generate a hypergraph for a plurality of cells included in a communications network, wherein the plurality of cells correspond to a plurality of vertices of the hypergraph, wherein one or more cumulative transmission interference regions, associated with the plurality of cells, correspond to one or more hyperedges of the hypergraph, and wherein at least a subset of the plurality of cells are included in at least one hyperedge of the one or more hyperedges; identify one or more parameters for allocating operating transmission frequencies to the plurality of cells; generate a constraint model based on the hypergraph and the one or more parameters; determine, using a quantum solver, one or more minimum energy states of the constraint model, wherein the one or more minimum energy states correspond to respective operating transmission frequency allocation configurations for the plurality of cells; and assign, based on an operating transmission frequency allocation configuration corresponding to a minimum energy state of the one or more minimum energy states, operating transmission frequencies to the plurality of cells.

BRIEF DESCRIPTION OF THE DRAWINGS

FIGS. 1A-1H are diagrams of one or more example implementations described herein.

DETAILED DESCRIPTION

Figure 1A:
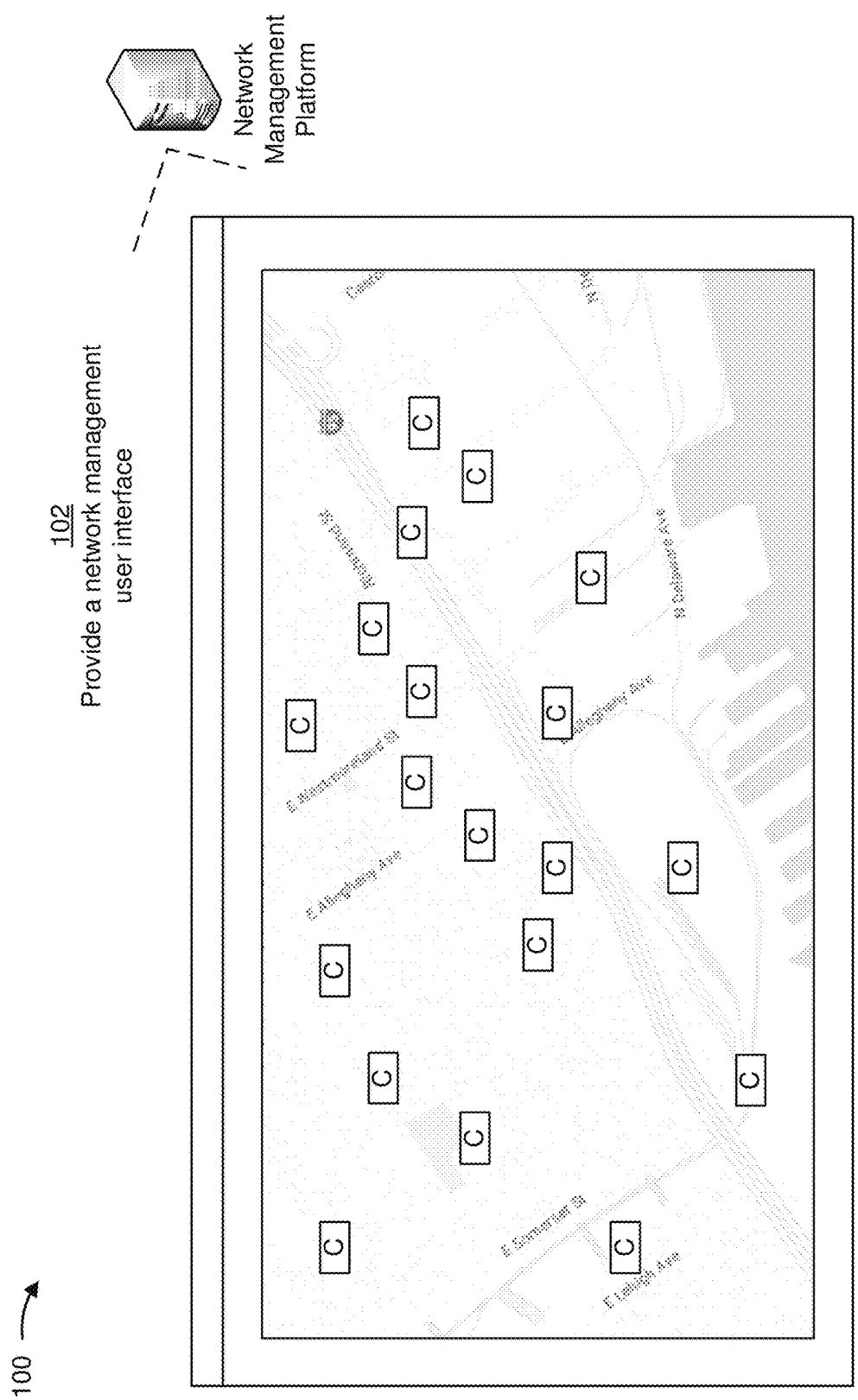

The following detailed description of example implementations refers to the accompanying drawings. The same reference numbers in different drawings may identify the same or similar elements.

5G/NR communications networks may use very high frequency bands, which may limit the coverage area of cells that are deployed in the communications networks. Accordingly, 5G/NR communications networks may use a small cell concept, in which small cells are deployed in an ultra-dense manner (e.g., such that the small cells are deployed within a few kilometers of other small cells, compared to multiple tens of kilometers for macro cells). Small cells may be capable of delivering high data rates by utilizing very high frequency bands and serving a small geographic area (e.g., a 1-2 kilometer radius).

Ultra-dense deployment of small cells in a 5G/NR communications network may lead to differences in resource allocation relative to other types of cells and/or communications networks. For example, in other types of communications networks, wireless frequency spectrums may be reused in nearby cells. However, wireless frequency spectrum reuse in nearby cells may be impractical in a heterogeneous ultra-dense network (HUDN) (e.g., an ultra-dense network that includes a combination of different types of cells) due to the dense deployment of small cells. As a result, interference among neighboring cells in an HUDN may be more severe relative to other types of networks due to the close proximity of small cells. As another example, a wireless communication device may communicatively connect with a macro cell that provides a satisfactory signal-to-interference-plus-noise ratio (SINR), whereas a HUDN may consider load-based factors for macro cell and/or small cell selection. In addition, a wireless communication device may communicatively connect with multiple different types of cells in a HUDN, which may be referred to as multiple connectivity. In a dual connectivity mode, a wireless communication device may simultaneously connect to a macro cell and a small cell, and may split traffic between cells and on different operating transmission frequencies.

Some implementations described herein provide methods and devices for effective resource allocation in a communications network, such as an HUDN. In some implementations, a network management platform may use cumulative transmission interference regions, associated with a plurality of cells included in the communications network, to determine an operating transmission frequency allocation configuration for the plurality of cells. The network management platform may determine the operating transmission frequency allocation configuration by modelling the plurality of cells and corresponding cumulative transmission interference regions as a hypergraph, in which the plurality of cells may be represented as vertices and the cumulative transmission interference regions may be represented as hyperedges. The network management platform may use a quantum solver to perform a hypergraph coloring operation to assign operating transmission frequencies to the plurality of cells in a manner that minimizes the quantity of distinct operating transmission frequencies allocated to the plurality of cells. The operating transmission frequency allocation configuration may be the output from the hypergraph coloring operation. The network management platform may assign operating transmission frequencies to the plurality of cells based on the operating transmission frequency allocation configuration.

In this way, the techniques and actions performed by the network management platform improve the performance of the plurality of cells in that the network management platform assigns operating transmission frequencies to the plurality of cells in a manner that reduces inter-cell interference among the plurality of cells. This increases the reliability and throughput plurality of cells, reduces latency and dropped communications in the plurality of cells, and/or the like.

Moreover, the techniques and actions performed by the network management platform improve the performance of the communications network in that the network management platform assigns operating transmission frequencies to the plurality of cells in a manner that permits cells to be positioned closer to other cells without causing an unacceptable amount of interference, which increases the cell density, wireless coverage, and reliability of the communications network; decreases dropped communications of the communications network; and/or the like.

In addition, the techniques and actions performed by the network management platform improve the performance of the communications network in that the network management platform assigns operating transmission frequencies to the plurality of cells in a manner that reduces the complexity of deploying and maintaining the communications network in that the network management platform minimizes the quantity of distinct operating transmission frequencies deployed in the communications network.

Further, the techniques and actions performed by the network management platform improve the performance of the communications network in that the network management platform assigns operating transmission frequencies to the plurality of cells using quantum solvers and quantum processors, which reduces the time duration of determining operating transmission frequency allocation configurations. This permits the network management platform to determine operating transmission frequency allocation configurations dynamically and/or in real-time such that the communications network may be cautiously optimized when new cells are added to the communications network, when existing cells in the communications network are relocated and/or reconfigured, when cells are removed from the communications network, and/or the like.

FIGS. 1A-1H are diagrams of one or more example implementations 100 described herein. As shown in FIGS. 1A-1H, example implementations 100 may include one or more devices, such as a plurality of cells and a network management platform. The plurality of cells may be included in a communications network. The communications network may include a 5G/NR communications network or another type of communications network such as a fourth generation Long Term Evolution (4G/LTE) communications network and/or the like.

The communications network may include a HUDN that includes a plurality of different types of cells. In this case, the plurality of cells may include various types of communications network cells, such as small cells (e.g., microcells, picocells, femtocells, and/or the like), macro cells, relays, and/or the like. In some implementations, the plurality of cells may correspond to respective base stations. In some implementations, two or more cells of the plurality of cells may correspond to the same base station.

The network management platform may include one or more devices that are capable of performing one or more actions to manage the plurality of cells included in the communications network. For example, the network management platform may receive information from the plurality of cells and/or other devices included in the communications network, may receive inputs (e.g., inputs to the network management platform, inputs received from other devices such as user devices, and/or the like), and/or the like. Moreover, the network management platform may perform one or more actions based on the received information and/or inputs, such as determining a deployment configuration for the plurality of cells (e.g., determining locations for deploying cells in the communications network, determining types of cells to deploy at particular locations in the communications network, and/or the like), determining an operating configuration for the plurality of cells (e.g., determining operating transmission frequencies for cells in the communications network, determining cell size and shape for cells in the communications network, and/or the like), and/or the like.

As shown in FIG. 1A, and by reference number 102, the network management platform may provide a network management user interface, which may be used to visualize the plurality of cells deployed in the communications network, may be used to visualize changes to the communications network (e.g., may be used to visualize changes to coverage maps and/or interference maps based on moving the location of a cell or changing an operating transmission frequency of cell, and/or the like), may be used to analyze a hypothetical deployment of the plurality of cells, may be used to determine an operating transmission frequency allocation configuration for the plurality of cells, and/or the like.

In some implementations, an operating transmission frequency allocation configuration may specify operating transmission frequencies that are assigned to cells in the communications network. In other words, an operating transmission frequency allocation configuration may specify an operating transmission frequency for each cell in the communications network or may specify operating transmission frequencies for a subset of cells in the communications network.

As shown in FIG. 1A, the network management user interface may include a graphical user interface in which a map may be displayed along with an overlay of cells in the communications network. The map may include a navigation map, a satellite image map, a topological map, and/or the like. Moreover, the network management user interface may include one or more fields that permit users to provide inputs and/or instructions for the network management platform. For example, the one or more fields may permit a user to select a plurality of cells for which the network management platform is to determine an operating transmission frequency allocation configuration, specify one or more parameters according to which the network management platform is to determine the operating transmission frequency allocation, and/or the like.

Figure 1B:
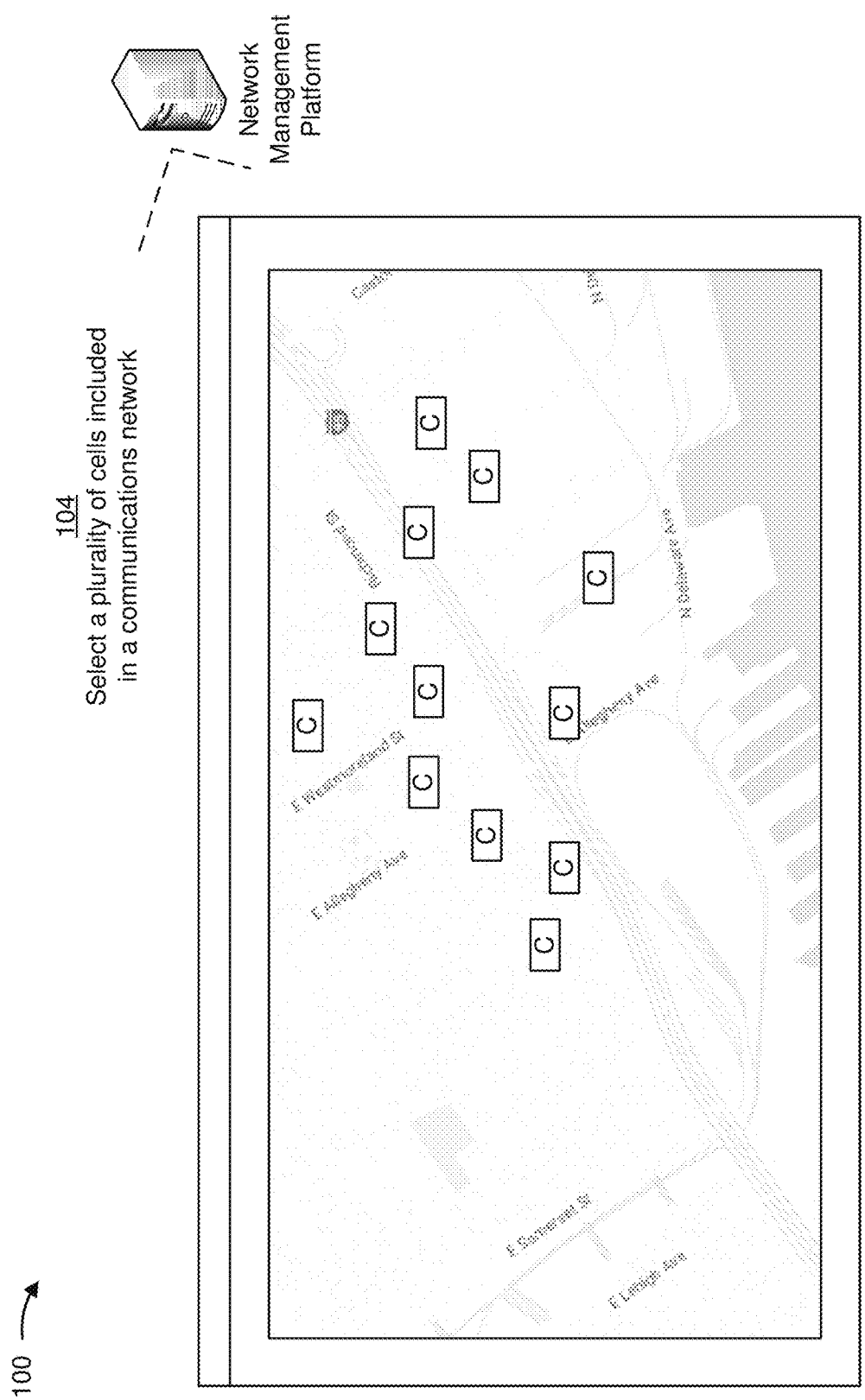

As shown in FIG. 1B, and by reference number 104, to generate an operating transmission frequency allocation configuration for a plurality of cells included in the communications network, the network management platform may select the plurality of cells. In some implementations, the plurality of cells may include all or a subset of cells included in the communications network.

In some implementations, the network management platform may select the plurality of cells based on input provided by a user via the network management user interface. For example, the input may specify the cells that are to be included in the plurality of cells. As another example, the input may specify a particular geographic area (e.g., a city, an urban area, a geographic area of a particular size, a boundary that is drawn around the particular geographic area, and/or the like) in which the plurality of cells are included.

In some implementations, the network management platform may automatically select the plurality of cells. The network management platform may automatically select the plurality of cells based on various criteria, such as cell type (e.g., may select small cells in a geographic area), based on detecting or determining interference between the plurality of cells (e.g., based on information received from the plurality of cells, such as transmit power information, SINR information, and/or the like), and/or the like.

Figure 1C:
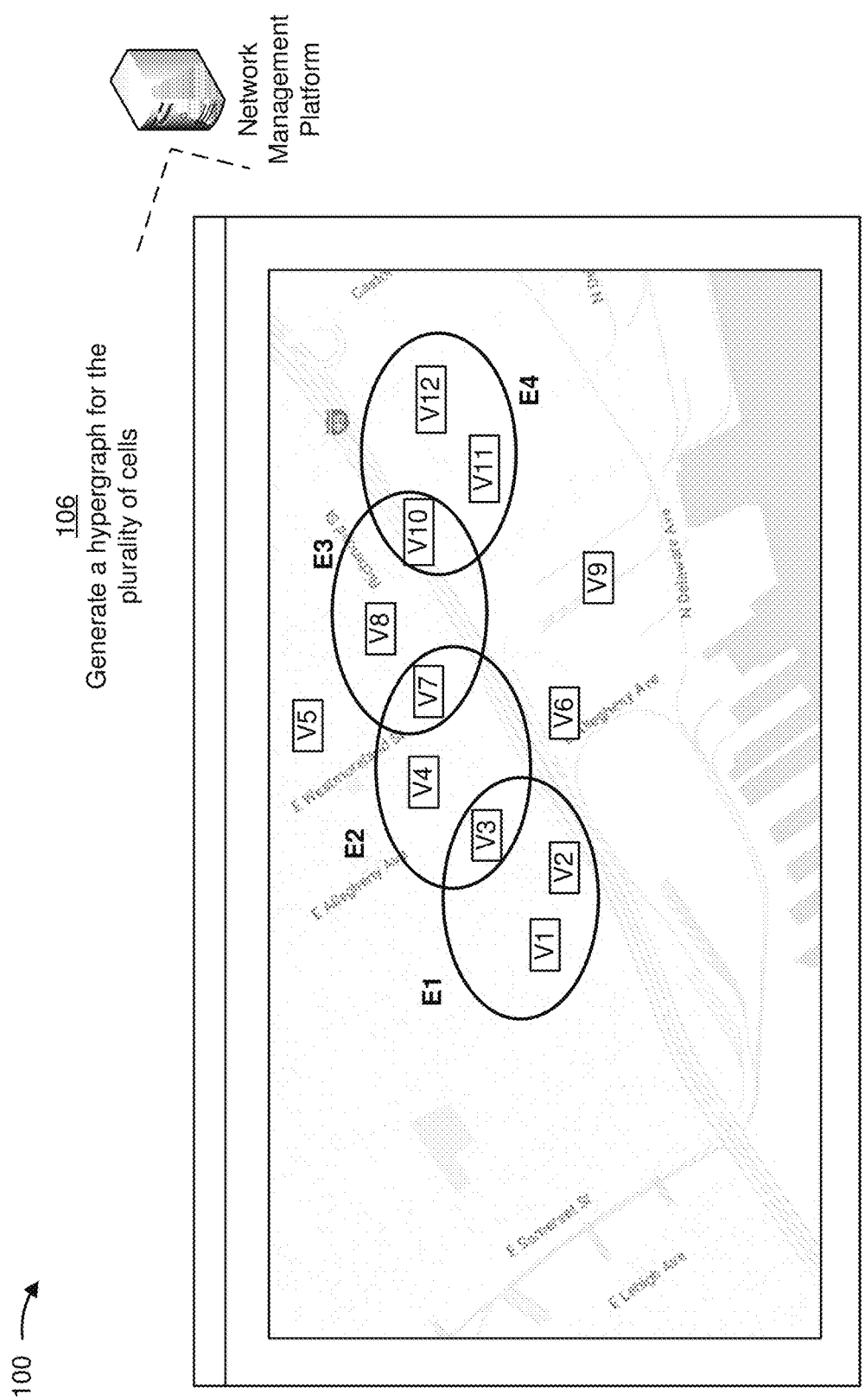

As shown in FIG. 1C, and by reference number 106, the network management platform may generate a hypergraph for the plurality of cells. The hypergraph may represent a model of the plurality of cells in the communications network. The vertices (or nodes) of the hypergraph (e.g., V1 though V12) may represent respective cells of the plurality of cells. The hyperedges of the hypergraph (e.g., E1 through E4) may represent cumulative transmission interference regions associated with one or more of the plurality of cells. As shown in FIG. 1C, a subset of the plurality of cells may be included in a particular cumulative transmission interference region, a particular cell of the plurality of cells may be included in a plurality of cumulative transmission interference regions, a cell of the plurality of cells may not be included in a cumulative transmission interference region, and/or the like.

A cumulative transmission interference region may include a geographic region in which a wireless communication device, communicatively connected to the communications network, may experience an amount of combined or cumulated interference from a plurality of cells that satisfies a threshold amount of interference if the plurality of cells are operating using the same operating transmission frequency. The network management platform may determine the cumulative transmission interference regions based on one or more parameters associated with the plurality of cells, such as location data associated with the plurality of cells, transmission range data associated with the plurality of cells, and/or the like. The network management platform may reduce cumulative interference among the plurality of cells by using the hypergraph to generate an operating transmission frequency allocation configuration such that a particular operating transmission frequency is assigned to not more than one cell in a particular hyperedge (cumulative transmission interference region).

To generate the operating transmission frequency allocation configuration from the hypergraph of the plurality of cells, the network management platform may feed the hypergraph into a hypergraph coloring operation and use a quantum solver to solve the hypergraph coloring operation such that the vertices (cells) are assigned a color (operating transmission frequency) in a configuration that minimizes the quantity of distinct colors (operating transmission frequencies) assigned in the hypergraph while ensuring that each vertex (cell) in a particular hyperedge (cumulative transmission interference region) is assigned a different color (operating transmission frequency).

Since the quantity of cells that may be modeled by the hypergraph potentially includes multiple thousands of cells, the network management platform may provide a quantum computing environment to reduce the processing time of generating an operating transmission frequency allocation configuration for multiple thousands of cells. The quantum computing environment may include a combination of hardware (e.g., one or more quantum processing units (QPUs)) and software (e.g., one or more quantum solvers, one or more quantum samplers, and/or the like) that is capable of generating a plurality of candidate operating transmission frequency allocation configurations in parallel.

Figure 1D:
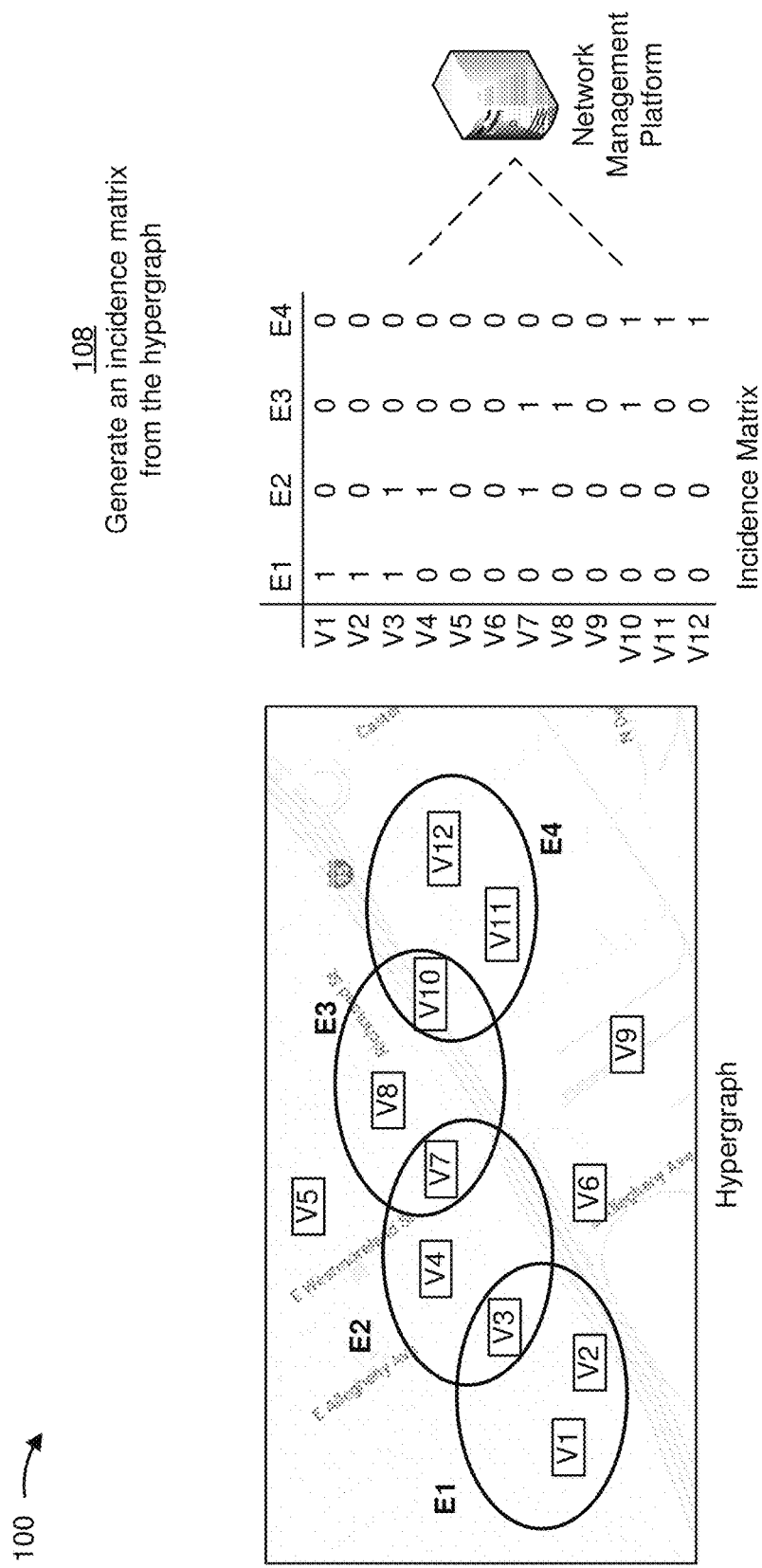

As shown in FIG. 1D, and by reference number 108, to prepare the hypergraph for processing by the quantum computing environment, the network management platform may generate an incidence matrix from the hypergraph. The incidence matrix may include a binary matrix that includes a plurality of columns and rows that represent the hyperedges and vertices, respectively, of the hypergraph. To generate the incidence matrix, the network management platform may generate a quadratic unconstrained binary optimization (QUBO) problem of the hypergraph and may convert the QUBO problem to the incidence matrix. The QUBO problem may include a quadratic polynomial that represents a pattern matching problem for a hypergraph coloring operation, where the goal is to minimize the quadratic polynomial over binary variables (e.g., vertices, hyperedges, assignable operating transmission frequencies, and/or the like). The network management platform may convert the QUBO problem to the incidence matrix such that the hypergraph is in a format that can be processed by the quantum computing environment.

As shown in FIG. 1E, and by reference number 110, since the QUBO is an unconstrained problem, the network management platform may identify one or more parameters, for assigning operating transmission frequencies to the plurality of cells, that may function as constraints for the hypergraph coloring operation. The network management platform may identify the one or more parameters based on the one or more parameters being specified as input (e.g., based on the one or more parameters being specified in input to the network management user interface, based on the one or more parameters being provided by another device, and/or the like), based on a configuration of the communications network (e.g., based on a quantity of available operating transmission frequencies for the communications network), based on information received from the plurality of cells (e.g., information indicating an operating transmission frequency range capability of a cell), and/or the like.

In some implementations, the one or more parameters may include a parameter specifying that each cell, of the plurality of cells, is to be assigned an operating transmission frequency, which may be represented by Equation 1:

$$\Sigma q_{cj}^{vi} \quad \text{Equation 1}$$

where q is a qubit, vi is a vertex (cell), i=1-x, x represents the total quantity of vertices included in a particular hyperedge, cj is a hypergraph color (operating transmission frequency), j=1-y, y represents the total quantity of colors (operating transmission frequencies) that are permitted to be assigned to vertices, and the summation is over i and j.

In some implementations, the one or more parameters may include a parameter specifying that each cell is to be assigned no more than one operating transmission frequency, which may be represented by Equation 2:

$$\Sigma q_{cj}^{vi} + q_{ck}^{vi} - 1 \quad \text{Equation 2}$$

where k=1-y and j!=k, and the summation is over i, j, and k.

In some implementations, the one or more parameters may include a parameter specifying that no more than one cell included in a particular hyperedge is to be assigned a particular operating transmission frequency, and a parameter specifying a maximum quantity of operating transmission frequencies that are permitted to be assigned to the plurality of cells, which may be represented by Equation 3:

$$\Sigma q_{ck}^{vi} + q_{ck}^{vj} = 1 \quad \text{Equation 3}$$

where i!j, vi, and vj are included in the same hyperedge, and the summation is over i, j, and k.

In some implementations, the one or more parameters may include a parameter specifying a maximum quantity of operating transmission frequencies that are permitted to be assigned to the plurality of cells, a parameter specifying that each operating transmission frequency of the maximum quantity of operating transmission frequencies is to be assigned to the plurality of cells, a parameter specifying the particular operating transmission frequencies that may be assigned to the plurality of cells, a parameter specifying which operating transmission frequencies may or may not be assigned to a particular cell (e.g., based on the operating transmission frequency range capability of the cell), and/or the like. In some implementations, the network management platform may generate one or more constraint matrices based on the one or more parameters. A constraint matrix may include a binary matrix that represents the one or more parameters. In some implementations, the network management platform may generate respective constraint matrices that represent respective parameters.

As further shown in FIG. 1E, and by reference number 112, the network management platform may generate a constraint model based on the incidence matrix and the one or more parameters (e.g., the one or more constraint matrices). The constraint model may include a binary quadratic model. The binary quadratic model may include a model of the QUBO of the hypergraph that is constrained by the one or more parameters specified for the hypergraph coloring operation. The network management platform may provide the constraint model to the quantum computing environment such that the network management platform may use the one or more QPUs and the one or more quantum solvers to perform the hypergraph coloring operation on the constraint model. In some implementations, the network management platform may provide the constraint model to the one or more quantum solvers via an API (e.g., a representational state transfer (REST) API and/or another type of API).

Figure 1F:
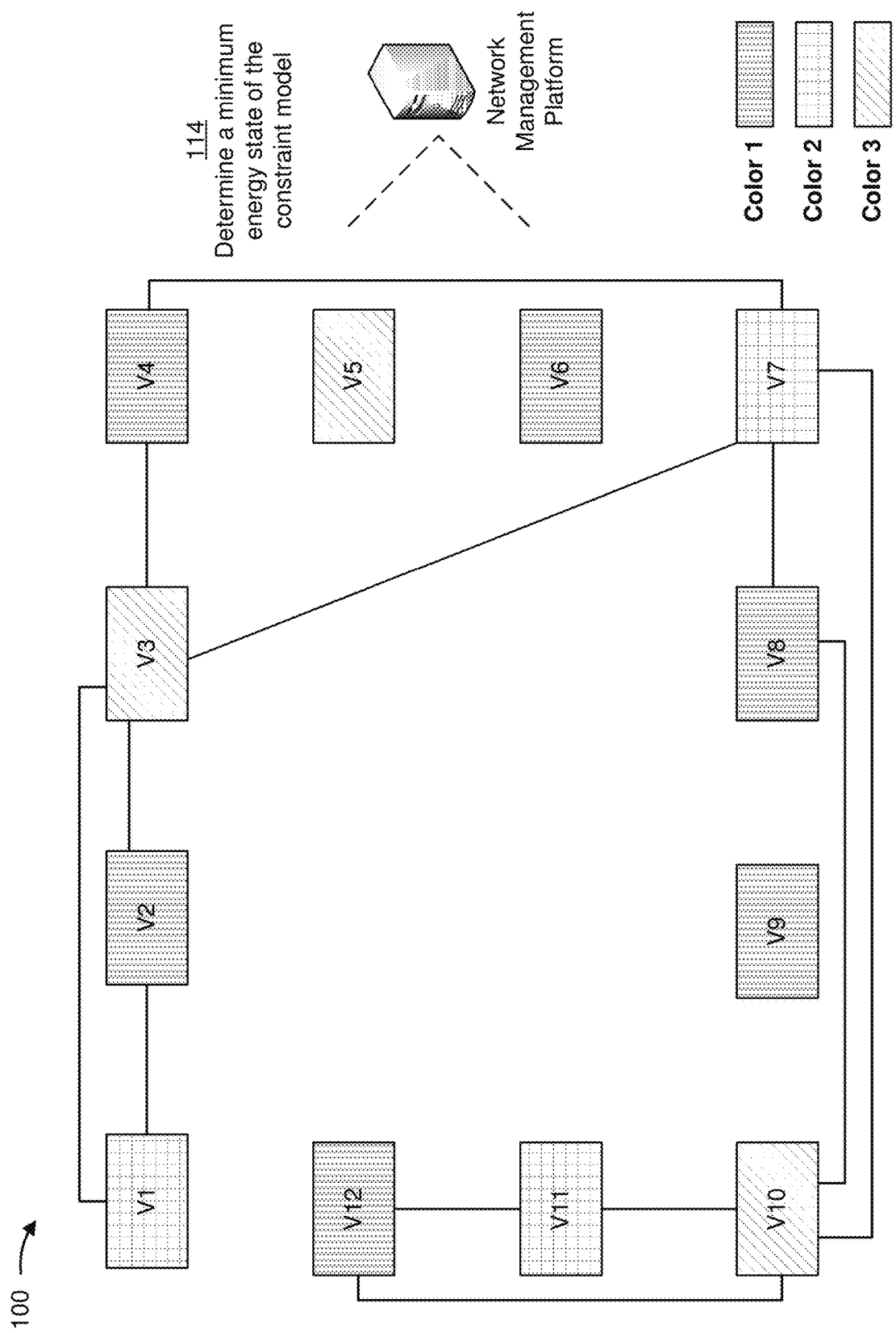

As shown in FIG. 1F, and by reference number 114, the network management platform may use the one or more QPUs and the one or more quantum solvers to perform the hypergraph coloring operation. The output of the hypergraph coloring operation may be an operating transmission frequency allocation configuration, for the plurality of cells, that results in a minimum energy state of the constraint model. A minimum energy state of the constraint model may include a hypergraph coloring configuration that results in the lowest value output from the constraint model. In some implementations, the lowest value output from the constraint model may be a zero value.

FIG. 1F illustrates an example output of the hypergraph coloring operation for vertices (cells) V1-V12. As shown in FIG. 1F, V2, V4, V6, V8, V9, and V12 may be assigned a first color (e.g., Color 1); V1, V7, and V11 may be assigned a second color (e.g., Color 2); and V3, V5, and V10 may be assigned a third color (e.g., Color 3). The first color, the second color, and the third color may correspond to different operating transmission frequencies.

In some implementations, the network management platform may perform the hypergraph coloring operation by assigning colors to the plurality of vertices (cells) such that the resulting operating transmission frequency allocation configuration satisfies the one or more parameters. For example, the network management platform may assign colors (operating transmission frequencies) such that no more than one vertex (cell) included in a hyperedge (cumulative transmission interference region), of the one or more hyperedges, is to be assigned a particular color (operating transmission frequency). In this case, the minimum energy state of the constraint model (e.g., zero output value) may correspond to an operating transmission frequency allocation configuration in which the network management platform assigns no more than a minimum quantity of colors (operating transmission frequencies) that is required to configure the plurality of vertices (cells) such that no more than one vertex (cell) included in a hyperedge (cumulative transmission interference region), of the one or more hyperedges, is assigned a particular color (operating transmission frequency).

To illustrate an example hypergraph coloring operation, the network management platform may assign colors (operating transmission frequencies) to two vertices (cells) included in a particular hyperedge (cumulative transmission interference region) based on Equation 4:

$$-2q_{c1}^{v1} - 2q_{c2}^{v1} - 2q_{c1}^{v2} - 2q_{c2}^{v2} + 2q_{c1}^{v1}q_{c1}^{v1} + 2q_{c2}^{v2}q_{c1}^{v1} + 2q_{c1}^{v1}q_{c2}^{v2} + 2q_{c1}^{v1}q_{c2}^{v1} + 4 = 0 \quad \text{Equation 4}$$

where v1 and v2 are the vertices (cells), and c1 and c2 are colors (operating transmission frequencies) that are permitted to be assigned to the vertices. The network management platform may generate the possible operating transmission frequency allocation configurations based on Equation 4, which are listed in Table 1:

TABLE 1

| $q_{c1}^{v1}$ | $q_{c2}^{v1}$ | $q_{c1}^{v2}$ | $q_{c2}^{v2}$ | Energy State |
|---|---|---|---|---|
| 0 | 0 | 0 | 0 | 4 |
| 0 | 0 | 0 | 1 | 2 |
| 0 | 0 | 1 | 0 | 2 |
| 0 | 0 | 1 | 1 | 2 |
| 0 | 1 | 0 | 0 | 2 |
| 0 | 1 | 0 | 1 | 2 |
| 0 | 1 | 1 | 0 | 0 |

TABLE 1-continued

| $q_{c1}^{v1}$ | $q_{c2}^{v1}$ | $q_{c1}^{v2}$ | $q_{c2}^{v2}$ | Energy State |
|---|---|---|---|---|
| 0 | 1 | 1 | 1 | 2 |
| 1 | 0 | 0 | 0 | 2 |
| 1 | 0 | 0 | 1 | 0 |
| 1 | 0 | 1 | 0 | 2 |
| 1 | 0 | 1 | 1 | 2 |
| 1 | 1 | 0 | 0 | 2 |
| 1 | 1 | 0 | 1 | 2 |
| 1 | 1 | 1 | 0 | 2 |
| 1 | 1 | 1 | 1 | 4 |

As shown in Table 1, the network management platform may determine that assigning different colors to v1 and v2 results in a minimum energy state for the binary object model (e.g., qubit configurations (0,1,1,0) and (1,0,0,1) in Table 1). In some implementations, Equations 1-4 and Table 1 above may be expanded to any quantity of vertices (cells) and/or colors (operating transmission frequencies).

In some implementations, the network management platform may select the operating transmission frequency allocation configuration that results in the minimum energy state for the binary object model. In some implementations, if a plurality of operating transmission frequency allocation configurations result in minimum energy states (e.g., the plurality of operating transmission frequency allocation configurations each result in a zero output value from the binary object model), the network management platform may select an operating transmission frequency allocation configuration from the plurality of operating transmission frequency allocation configurations. For example, the network management platform may rank the plurality of operating transmission frequency allocation configurations and may select the operating transmission frequency allocation configuration based on the ranking of the plurality of operating transmission frequency allocation configurations (e.g., the network management platform may select the operating transmission frequency allocation configuration that is the highest ranked or lowest ranked).

In some implementations, the network management platform may rank the plurality of operating transmission frequency allocation configurations based on various factors. For example, the network management platform may rank the plurality of operating transmission frequency allocation configurations based on a distribution of cells to each of the selected operating transmission frequencies. As an example, the network management platform may rank the plurality of operating transmission frequency allocation configurations from most evenly distributed to least evenly distributed. In this case, the operating transmission frequency allocation configuration in which each operating transmission frequency is assigned the same quantity of cells may be ranked first, and the remaining operating transmission frequency allocation configurations may be ranked accordingly. As another example, in order to minimize or maximize usage of a particular operating transmission frequency, the network management platform may rank the plurality of operating transmission frequency allocation configurations based on a quantity of cells that are assigned to the operating transmission frequency. In this case, the operating transmission frequency allocation configuration in which the quantity of cells assigned to the operating transmission frequency is the lowest or highest may be ranked first, and the remaining operating transmission frequency allocation configurations may be ranked accordingly.

Figure 1G:
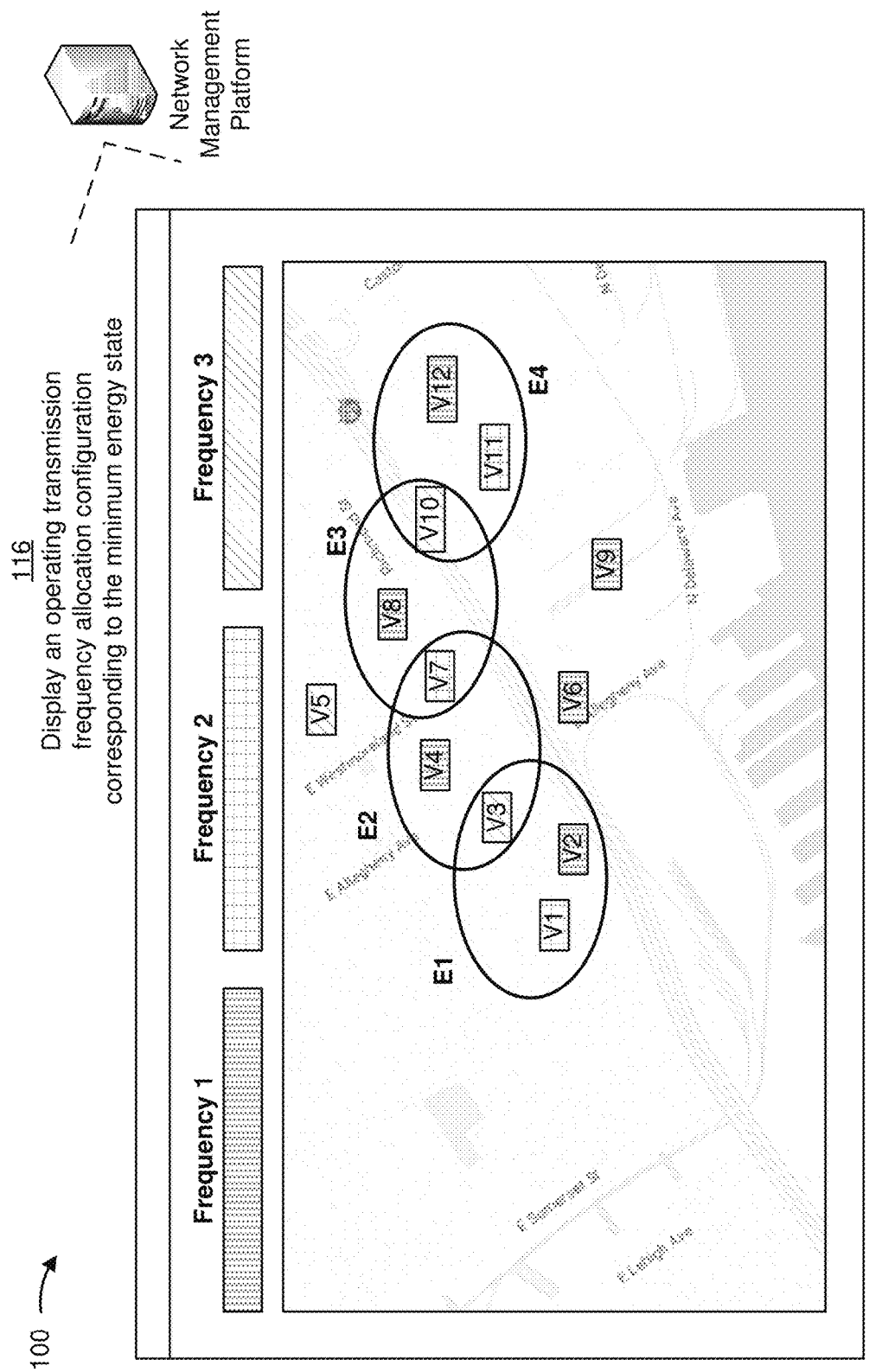

As shown in FIG. 1G, and by reference number 116, the network management platform may display a visual representation of an operating transmission frequency allocation configuration corresponding to the minimum energy state of the binary object model. The network management platform may display the visual representation of the operating transmission frequency allocation configuration in the network management user interface. In some implementations, if a plurality of operating transmission frequency allocation configurations correspond to the same minimum energy state, the network management platform may provide an option (e.g., a drop-down box, radio buttons, and/or the like) to select which operating transmission frequency allocation configuration is to be displayed in the network management user interface.

As shown in FIG. 1G, the network management user interface may visually indicate which operating transmission frequency is assigned to each cell of the plurality of the cells included in the hypergraph. An operating transmission frequency may be visually indicated by a distinct color, distinct shading (e.g., shading pattern, shading intensity or amount, and/or the like), distinct shape, and/or the like of a marker for a particular cell to which the operating transmission frequency is assigned. In some implementations, the network management user interface may further provide buttons and/or other types of input means such that the user may clear or reset the operating transmission frequency allocation configuration, modify the operating transmission frequency allocation configuration, clear the selection of the plurality of cells (e.g., such that another plurality of cells may be selected), provide an instruction to assign operating transmission frequencies to the plurality of cells based on the operating transmission frequency allocation configuration, and/or the like.

Figure 1H:
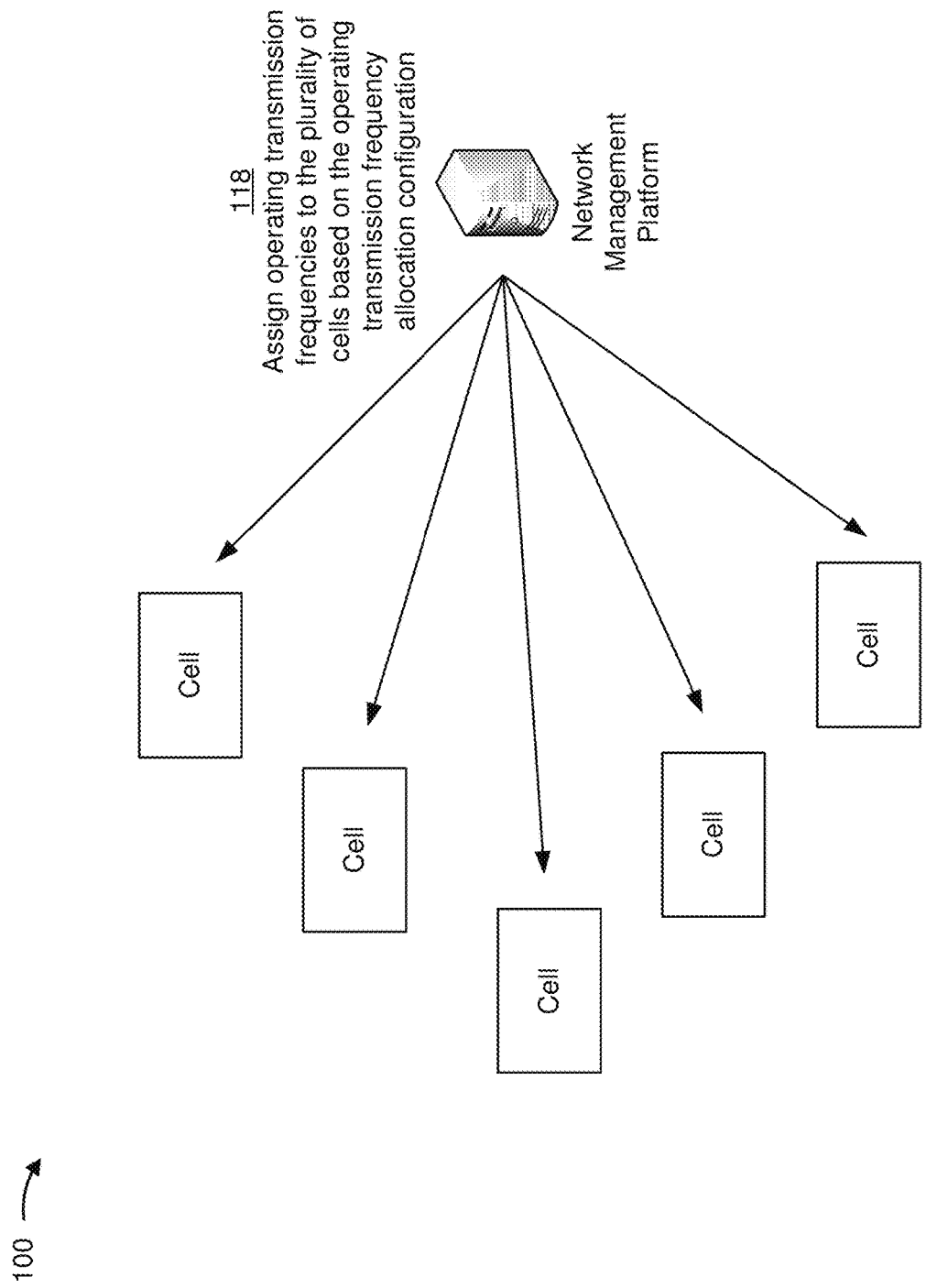

As shown in FIG. 1H, and by reference number 118, the network management platform may assign operating transmission frequencies to the plurality of cells based on the operating transmission frequency allocation configuration. In some implementations, the network management platform may automatically assign the operating transmission frequencies based on performing the hypergraph coloring operation and selecting the operating transmission frequency allocation configuration. In some implementations, the network management platform may assign the operating transmission frequencies based on receiving an instruction to assign the operating transmission frequencies as input via the network management user interface.

To assign operating transmission frequencies to the plurality of cells, the network management platform may configure the plurality of cells to operate using operating transmission frequencies based on the operating transmission frequency allocation configuration. For example, the network management platform may transmit an instruction to a particular cell, where the instruction indicates that the cell is to perform downlink and/or uplink communications using a particular operating transmission frequency. In some implementations, the network management platform may configure a cell with an operating transmission frequency by transmitting the instruction to a radio access network (RAN) manager device (and/or another device, associated with the cell, included in the communications network) associated with the cell, and the RAN manager may configure the cell to use the operating transmission frequency. Accordingly, the cell may communicate with one or more wireless communication devices, in a coverage area associated with the cell, using the operating transmission frequency.

In this way, the network management platform may perform effective resource allocation in a communications network, such as a HUDN. The network management platform may use cumulative transmission interference regions, associated with a plurality of cells included in the communications network, to determine an operating transmission frequency allocation configuration for the plurality of cells. The network management platform may determine the operating transmission frequency allocation configuration by modelling the plurality of cells and corresponding cumulative transmission interference regions as a hypergraph, in which the plurality of cells may be represented as vertices and the cumulative transmission interference regions may be represented as hyperedges. The network management platform may use a quantum solver to perform a hypergraph coloring operation to assign operating transmission frequencies to the plurality of cells in a manner that minimizes the quantity of distinct operating transmission frequencies allocated to the plurality of cells. The operating transmission frequency allocation configuration may be the output from the hypergraph coloring operation. The network management platform may assign operating transmission frequencies to the plurality of cells based on the operating transmission frequency allocation configuration.

In this way, the techniques and actions performed by the network management platform improve the performance of the plurality of cells in that the network management platform assigns operating transmission frequencies to the plurality of cells in a manner that reduces inter-cell interference among the plurality of cells. This increases the reliability and throughput plurality of cells, reduces latency and dropped communications in the plurality of cells, and/or the like.

Moreover, the techniques and actions performed by the network management platform improve the performance of the communications network in that the network management platform assigns operating transmission frequencies to the plurality of cells in a manner that permits cells to be positioned closer to other cells without causing an unacceptable amount of interference, which increases the cell density, wireless coverage, and reliability of the communications network; decreases dropped communications of the communications network; and/or the like.

In addition, the techniques and actions performed by the network management platform improve the performance of the communications network in that the network management platform assigns operating transmission frequencies to the plurality of cells in a manner that reduces the complexity of deploying and maintaining the communications network in that the network management platform minimizes the quantity of distinct operating transmission frequencies deployed in the communications network.

Further, the techniques and actions performed by the network management platform improve the performance of the communications network in that the network management platform assigns operating transmission frequencies to the plurality of cells using quantum solvers and quantum processors to assign the operating transmission frequencies, which reduces the time duration of determining operating transmission frequency allocation configurations. This permits the network management platform to determine operating transmission frequency allocation configurations dynamically and/or in real-time such that the communications network may be cautiously optimized when new cells are added to the communications network, when existing cells in the communications network are relocated and/or reconfigured, when cells are removed from the communications network, and/or the like.

As indicated above, FIGS. 1A-1H are provided merely as one or more examples. Other examples may differ from what is described with regard to FIGS. 1A-1H.

Figure 2:
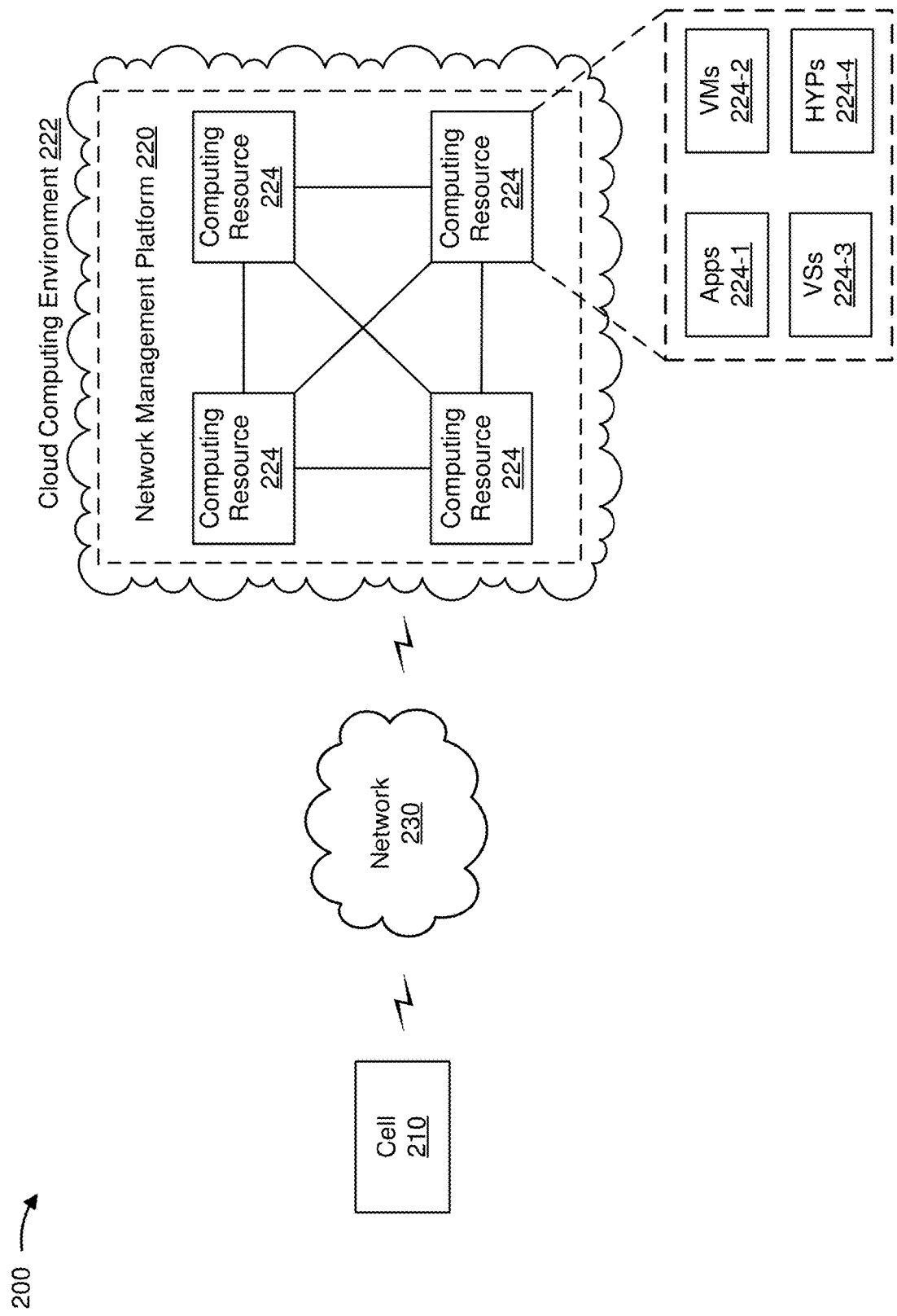
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a cell 210, a network management platform 220, and a network 230. Devices of environment 200 may interconnect via wired connections, wireless connections, or a combination of wired and wireless connections.

Cell 210 includes one or more devices capable of receiving, generating, storing, processing, and/or providing information associated with cell resource allocation, as described herein. For example, cell 210 may include an eNodeB associated with a 4G/LTE network, a gNodeB associated with a 5G/NR network, a base station associated with another type of RAN, a small cell base station, such as a base station of a microcell, a picocell, and/or a femtocell, and/or the like. In some implementations, cell 210 may communicate with one or more wireless communication devices (e.g., a communication and/or computing device, such as a mobile phone (e.g., a smart phone, a radiotelephone, and/or the like), a laptop computer, a tablet computer, a handheld computer, a gaming device, a wearable communication device (e.g., a smart wristwatch, a pair of smart eyeglasses, and/or the like), a stand-alone navigation device, a device that is integrated into a vehicle (e.g., a built-in navigation device, an infotainment system device, and/or the like), an IoT device, and/or a similar type of device). In some implementations, cell 210 may communicate using an operating transmission frequency.

Network management platform 220 includes one or more devices capable of generating an operating transmission frequency allocation configuration for a plurality of cells 210. For example, network management platform 220 may include one or more devices capable of generate a hypergraph for a plurality of cells 210, identifying one or more parameters for allocating operating transmission frequencies to the plurality of cells 210, generating a constraint model based on the hypergraph and the one or more parameters, determining (e.g., using a quantum solver) a minimum energy state of the constraint model corresponding to an operating transmission frequency allocation configuration for the plurality of cells 210, assigning, based on the operating transmission frequency allocation configuration corresponding to the minimum energy state, operating transmission frequencies to the plurality of cells 210, and/or the like.

In some implementations, network management platform 220 may be designed to be modular such that certain software components may be swapped in or out depending on a particular need. As such, network management platform 220 may be easily and/or quickly reconfigured for different uses. In some implementations, network management platform 220 may receive information from and/or transmit information to cell 210.

In some implementations, as shown, network management platform 220 may be hosted in a cloud computing environment 222. Notably, while implementations described herein describe network management platform 220 as being hosted in cloud computing environment 222, in some implementations, network management platform 220 may not be cloud-based (i.e., may be implemented outside of a cloud computing environment) or may be partially cloud-based. Cloud computing environment 222 includes an environment that hosts network management platform 220. Cloud computing environment 222 may provide computation, software, data access, storage, etc. services that do not require end-user knowledge of a physical location and configuration of system(s) and/or device(s) that hosts network management platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host network management platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by one or more other devices. Application 224-1 may eliminate a need to install and execute the software applications on the one or more other devices. For example, application 224-1 may include software associated with network management platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of another device or an operator of network management platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
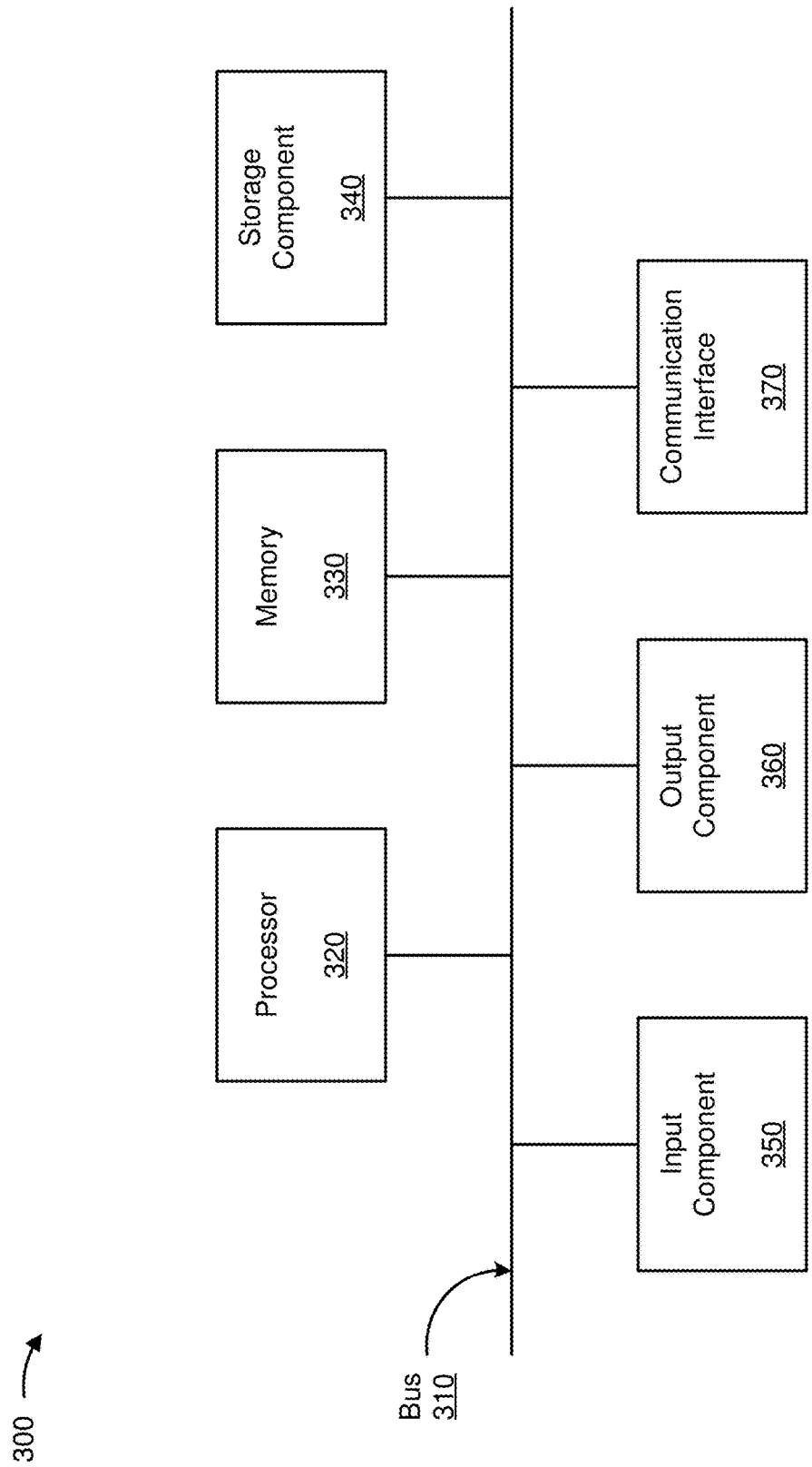
FIG. 3 is a diagram of example components of one or more devices of FIG. 2.

FIG. 3 is a diagram of example components of a device 300. Device 300 may correspond to cell 210, network management platform 220, computing resource 224, and/or one or more devices included in network 230. In some implementations, cell 210, network management platform 220, computing resource 224, and/or one or more devices included in network 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a quantum processing unit (QPU) (e.g., which may be used to provide a quantum computing environment), central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
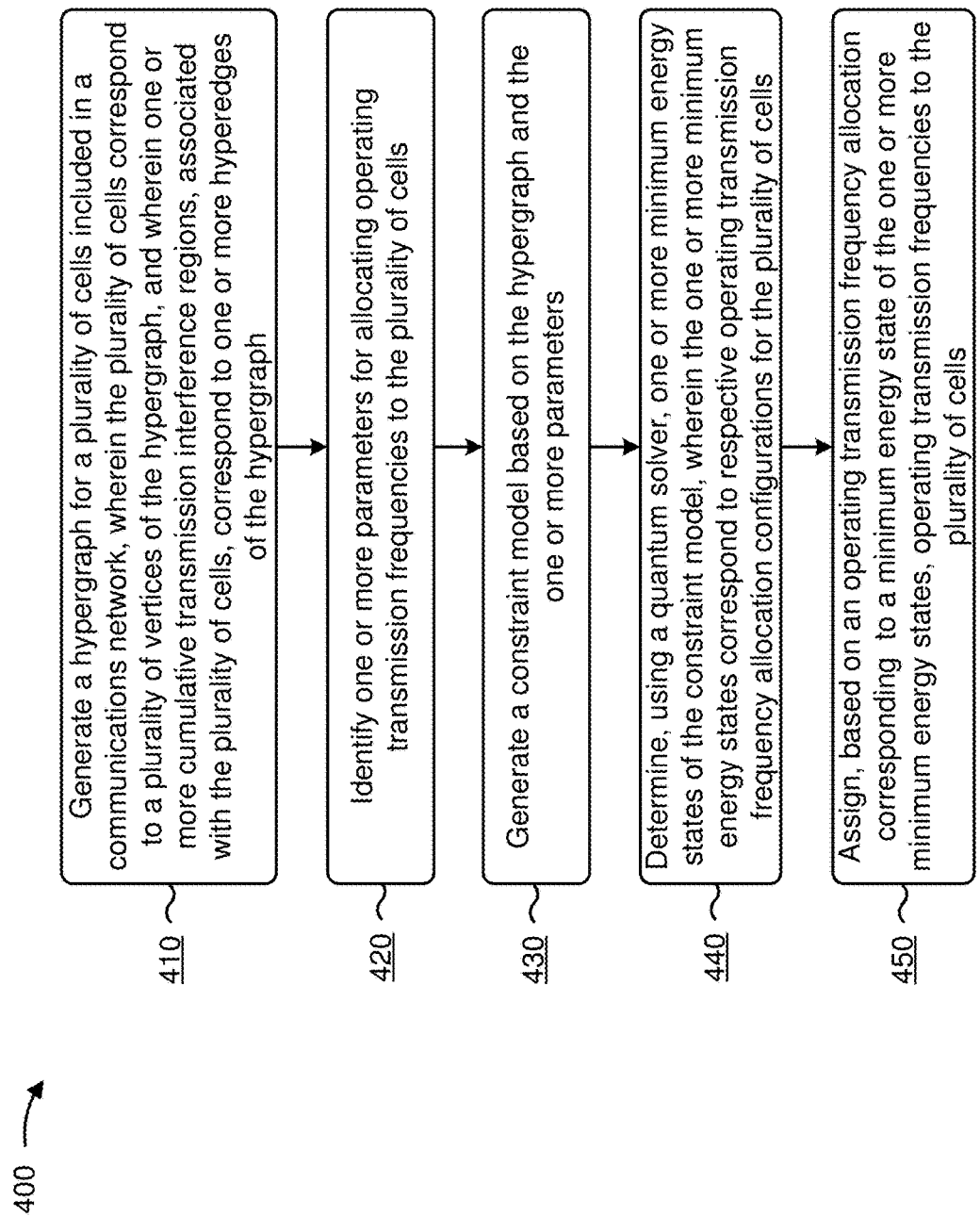
FIGS. 4-6 are flow charts of example processes for cell resource allocation.

FIG. 4 is a flow chart of an example process 400 for cell resource allocation. In some implementations, one or more process blocks of FIG. 4 may be performed by a device (e.g., network management platform 220, device 300, and/or the like). In some implementations, one or more process blocks of FIG. 4 may be performed by another device or a group of devices separate from or including the device, such as one or more cells (e.g., cell 210) and/or the like.

As shown in FIG. 4, process 400 may include generating a hypergraph for a plurality of cells included in a communications network, wherein the plurality of cells correspond to a plurality of vertices of the hypergraph, and wherein one or more cumulative transmission interference regions, associated with the plurality of cells, correspond to one or more hyperedges of the hypergraph (block 410). For example, the device (e.g., using computing resource 224, processor 320, memory 330, storage component 340, input component 350, output component 360, communication interface 370 and/or the like) may generate a hypergraph for a plurality of cells included in a communications network, as described above. In some implementations, the plurality of cells correspond to a plurality of vertices of the hypergraph. In some implementations, one or more cumulative transmission interference regions, associated with the plurality of cells, correspond to one or more hyperedges of the hypergraph.

As further shown in FIG. 4, process 400 may include identifying one or more parameters for allocating operating transmission frequencies to the plurality of cells (block 420). For example, the device (e.g., using computing resource 224, processor 320, memory 330, storage component 340, input component 350, output component 360, communication interface 370 and/or the like) may identify one or more parameters for allocating operating transmission frequencies to the plurality of cells, as described above.

As further shown in FIG. 4, process 400 may include generating a constraint model based on the hypergraph and the one or more parameters (block 430). For example, the device (e.g., using computing resource 224, processor 320, memory 330, storage component 340, input component 350, output component 360, communication interface 370 and/or the like) may generate a constraint model based on the hypergraph and the one or more parameters, as described above.

As further shown in FIG. 4, process 400 may include determining, using a quantum solver, one or more minimum energy states of the constraint model, wherein the one or more minimum energy states correspond to respective operating transmission frequency allocation configurations for the plurality of cells (block 440). For example, the device (e.g., using computing resource 224, processor 320, memory 330, storage component 340, input component 350, output component 360, communication interface 370 and/or the like) may determine, using a quantum solver, one or more minimum energy states of the constraint model, as described above. In some implementations, the one or more minimum energy states correspond to respective operating transmission frequency allocation configurations for the plurality of cells.

As further shown in FIG. 4, process 400 may include assigning, based on an operating transmission frequency allocation corresponding to a minimum energy state of the one or more minimum energy states, operating transmission frequencies to the plurality of cells (block 450). For example, the device (e.g., using computing resource 224, processor 320, memory 330, storage component 340, input component 350, output component 360, communication interface 370 and/or the like) may assign, based on an operating transmission frequency allocation corresponding to a minimum energy state of the one or more minimum energy states, operating transmission frequencies to the plurality of cells, as described above.

Process 400 may include additional implementations, such as any single implementation or any combination of implementations described below and/or in connection with one or more other processes described elsewhere herein.

In some implementations, the one or more parameters comprise at least one of a parameter specifying a maximum quantity of operating transmission frequencies that are permitted to be assigned to the plurality of cells, a parameter specifying that each cell, of the plurality of cells, is to be assigned an operating transmission frequency, or a parameter specifying that no more than one cell included in a hyperedge, of the one or more hyperedges, is to be assigned a particular operating transmission frequency. In some implementations, generating the constraint model comprises generating a QUBO of the hypergraph, converting the QUBO to an incidence matrix, and generating the constraint model based on the incidence matrix and the one or more parameters. In some implementations, generating the constraint model comprises generating a constraint matrix based on the one or more parameters and generating the constraint model based on the hypergraph and the constraint matrix.

In some implementations, determining the one or more minimum energy states of the constraint model comprises performing a hypergraph coloring operation to determine the minimum energy state of the one or more minimum energy states. In some implementations, performing the hypergraph coloring operation comprises assigning a plurality of colors to the plurality of cells such that no more than one cell included in a hyperedge, of the one or more hyperedges, is to be assigned a particular color, wherein the plurality of colors correspond to respective operating transmission frequencies. In some implementations, process 400 further comprises selecting the minimum energy state based on a ranking of the one or more minimum energy states. In some implementations, the constraint model comprises a binary quadratic model.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
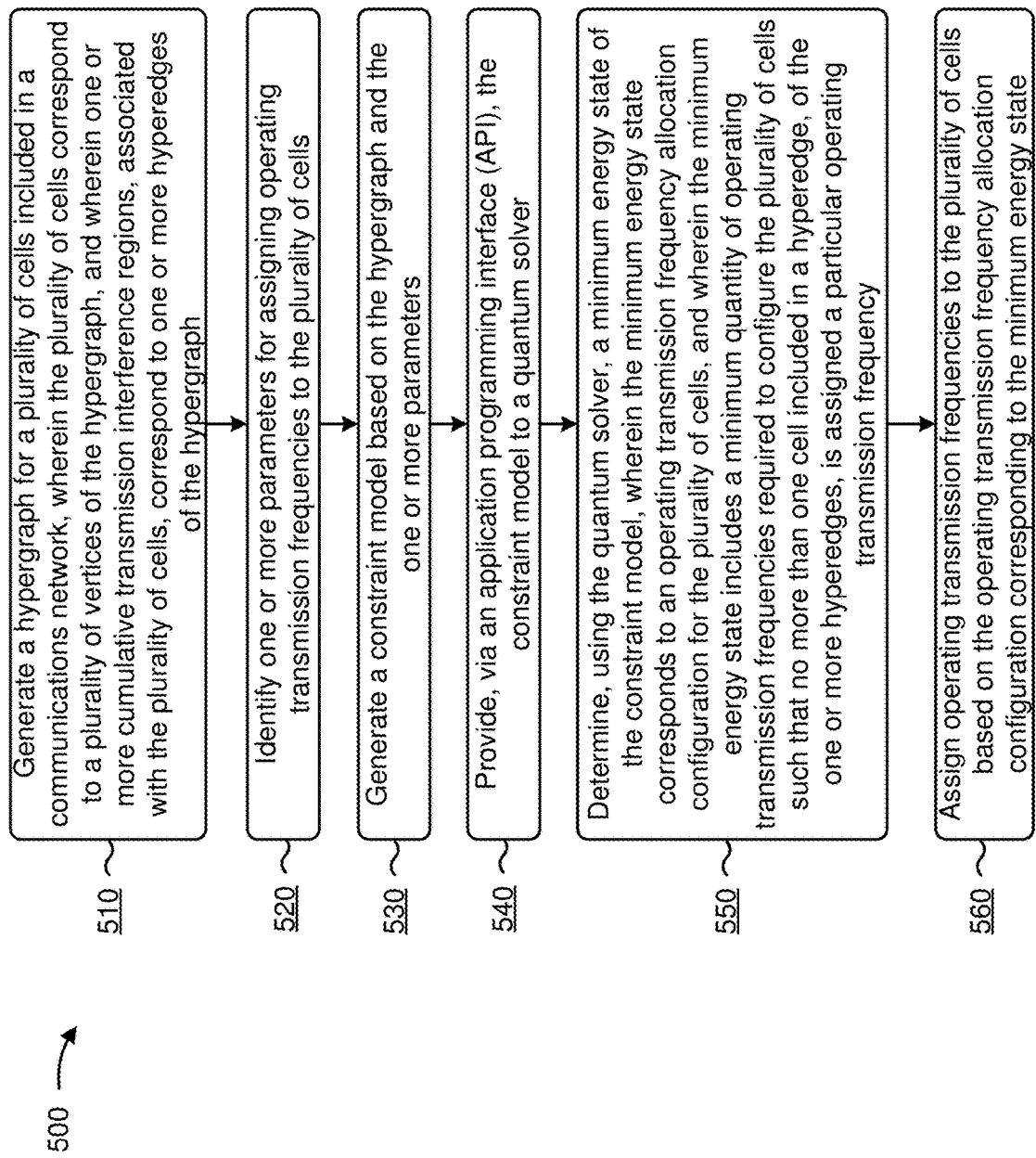

FIG. 5 is a flow chart of an example process 500 for cell resource allocation. In some implementations, one or more process blocks of FIG. 5 may be performed by a device (e.g., network management platform 220, device 300, and/or the like). In some implementations, one or more process blocks of FIG. 5 may be performed by another device or a group of devices separate from or including the device, such as one or more cells (e.g., cell 210) and/or the like.

As shown in FIG. 5, process 500 may include generating a hypergraph for a plurality of cells included in a communications network, wherein the plurality of cells correspond to a plurality of vertices of the hypergraph, and wherein one or more cumulative transmission interference regions, associated with the plurality of cells, correspond to one or more hyperedges of the hypergraph (block 510). For example, the device (e.g., using computing resource 224, processor 320, memory 330, storage component 340, input component 350, output component 360, communication interface 370 and/or the like) may generate a hypergraph for a plurality of cells included in a communications network, as described above. In some implementations, the plurality of cells correspond to a plurality of vertices of the hypergraph. In some implementations, one or more cumulative transmission interference regions, associated with the plurality of cells, correspond to one or more hyperedges of the hypergraph.

As further shown in FIG. 5, process 500 may include identifying one or more parameters for assigning operating transmission frequencies to the plurality of cells (block 520). For example, the device (e.g., using computing resource 224, processor 320, memory 330, storage component 340, input component 350, output component 360, communication interface 370 and/or the like) may identify one or more parameters for assigning operating transmission frequencies to the plurality of cells, as described above.

As further shown in FIG. 5, process 500 may include generating a constraint model based on the hypergraph and the one or more parameters (block 530). For example, the device (e.g., using computing resource 224, processor 320, memory 330, storage component 340, input component 350, output component 360, communication interface 370 and/or the like) may generate a constraint model based on the hypergraph and the one or more parameters, as described above.

As further shown in FIG. 5, process 500 may include providing, by the device and via an API, the constraint model to a quantum solver (block 540). For example, the device (e.g., using computing resource 224, processor 320, memory 330, storage component 340, input component 350, output component 360, communication interface 370 and/or the like) may provide, by the device and via an API, the constraint model to a quantum solver, as described above.

As further shown in FIG. 5, process 500 may include determining, using the quantum solver, a minimum energy state of the constraint model, wherein the minimum energy state corresponds to an operating transmission frequency allocation configuration for the plurality of cells, and wherein the minimum energy state includes a minimum quantity of operating transmission frequencies required to configure the plurality of cells such that no more than one cell included in a hyperedge, of the one or more hyperedges, is assigned a particular operating transmission frequency (block 550). For example, the device (e.g., using computing resource 224, processor 320, memory 330, storage component 340, input component 350, output component 360, communication interface 370 and/or the like) may determine, using the quantum solver, a minimum energy state of the constraint model, as described above. In some implementations, the minimum energy state corresponds to an operating transmission frequency allocation configuration for the plurality of cells. In some implementations, the minimum energy state includes a minimum quantity of operating transmission frequencies required to configure the plurality of cells such that no more than one cell included in a hyperedge, of the one or more hyperedges, is assigned a particular operating transmission frequency.

As further shown in FIG. 5, process 500 may include assigning operating transmission frequencies to the plurality of cells based on the operating transmission frequency allocation configuration corresponding to the minimum energy state (block 560). For example, the device (e.g., using computing resource 224, processor 320, memory 330, storage component 340, input component 350, output component 360, communication interface 370 and/or the like) may assign operating transmission frequencies to the plurality of cells based on the operating transmission frequency allocation configuration corresponding to the minimum energy state, as described above.

Process 500 may include additional implementations, such as any single implementation or any combination of implementations described below and/or in connection with one or more other processes described elsewhere herein.

In some implementations, process 500 may further comprise generating, for display in a user interface, a visualization of the operating transmission frequency allocation configuration. In some implementations, respective operating transmission frequencies, of the operating transmission frequencies assigned to the plurality of cells, are indicated in the visualization by at least one of respective colors, respective shading patterns, respective amounts of shading, or respective shapes. In some implementations, determining the minimum energy state of the constraint model comprises determining that the operating transmission frequency allocation configuration, based on the minimum quantity of operating transmission frequencies, results in a zero output value for the constraint model.

In some implementations, determining the minimum energy state of the constraint model comprises determining that the operating transmission frequency allocation configuration satisfies the one or more parameters. In some implementations, the one or more parameters comprise a parameter specifying a maximum quantity of operating transmission frequencies that are permitted to be assigned to the plurality of cells. In some implementations, generating the constraint model based on the hypergraph and the one or more parameters comprises generating the constraint model based on an incident matrix associated with the hypergraph and a constraint matrix associated with the one or more parameters.

In some implementations, the one or more parameters comprise at least one of location data associated with the plurality of cells or transmission range data associated with the plurality of cells. In some implementations, determining the one or more cumulative transmission interference regions based on the one or more parameters.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
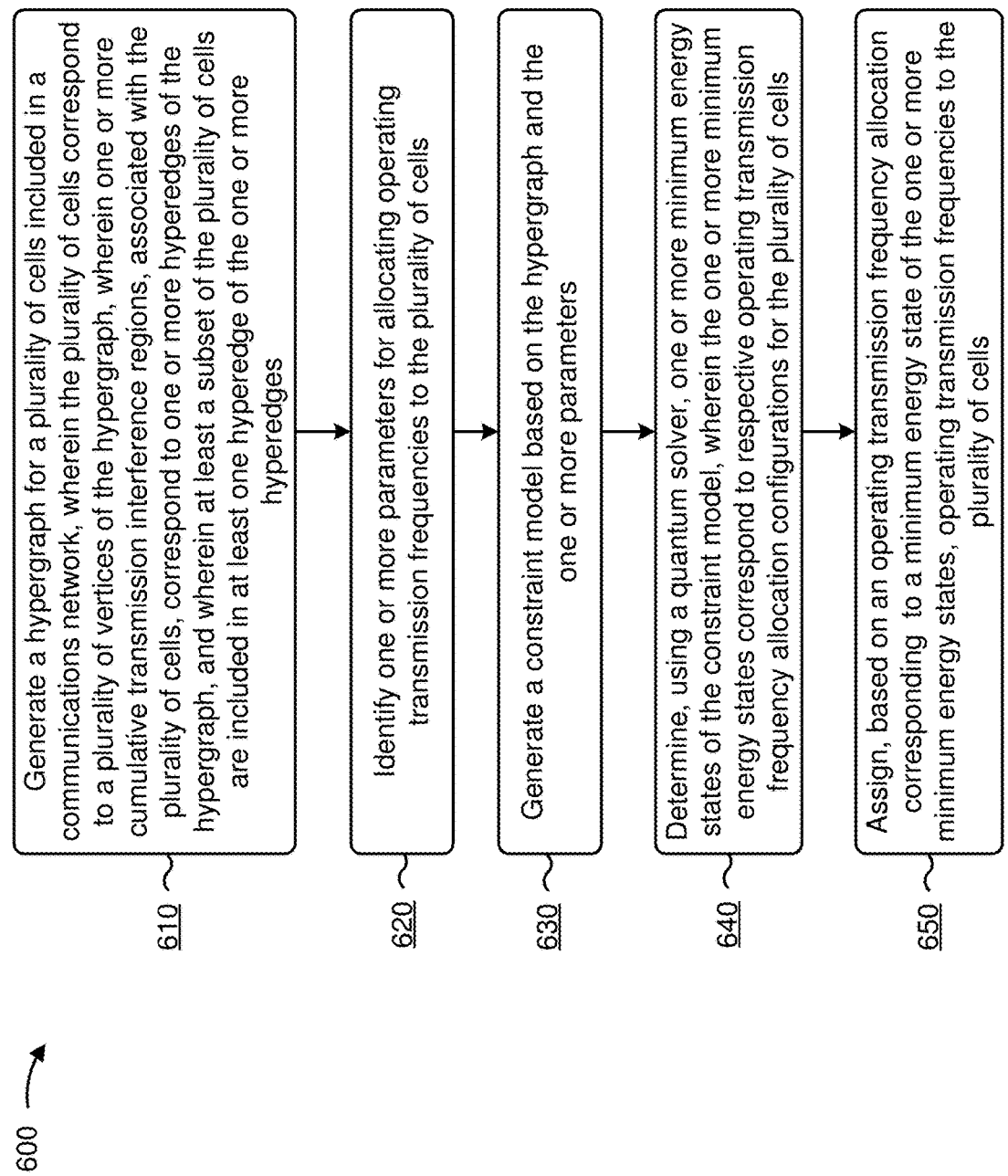

FIG. 6 is a flow chart of an example process 600 for cell resource allocation. In some implementations, one or more process blocks of FIG. 6 may be performed by a device (e.g., network management platform 220, device 300, and/or the like). In some implementations, one or more process blocks of FIG. 6 may be performed by another device or a group of devices separate from or including the device, such as one or more cells (e.g., cell 210) and/or the like.

As shown in FIG. 6, process 600 may include generating a hypergraph for a plurality of cells included in a communications network, wherein the plurality of cells correspond to a plurality of vertices of the hypergraph, wherein one or more cumulative transmission interference regions, associated with the plurality of cells, correspond to one or more hyperedges of the hypergraph, and wherein at least a subset of the plurality of cells are included in at least one hyperedge of the one or more hyperedges (block 610). For example, the device (e.g., using computing resource 224, processor 320, memory 330, storage component 340, input component 350, output component 360, communication interface 370 and/or the like) may generate a hypergraph for a plurality of cells included in a communications network, as described above. In some implementations, the plurality of cells correspond to a plurality of vertices of the hypergraph. In some implementations, one or more cumulative transmission interference regions, associated with the plurality of cells, correspond to one or more hyperedges of the hypergraph. In some implementations, at least a subset of the plurality of cells are included in at least one hyperedge of the one or more hyperedges.

As further shown in FIG. 6, process 600 may include identifying one or more parameters for allocating operating transmission frequencies to the plurality of cells (block 620). For example, the device (e.g., using computing resource 224, processor 320, memory 330, storage component 340, input component 350, output component 360, communication interface 370 and/or the like) may identify one or more parameters for allocating operating transmission frequencies to the plurality of cells, as described above.

As further shown in FIG. 6, process 600 may include generating a constraint model based on the hypergraph and the one or more parameters (block 630). For example, the device (e.g., using computing resource 224, processor 320, memory 330, storage component 340, input component 350, output component 360, communication interface 370 and/or the like) may generate a constraint model based on the hypergraph and the one or more parameters, as described above.

As further shown in FIG. 6, process 600 may include determining, using a quantum solver, one or more minimum energy states of the constraint model, wherein the one or more minimum energy states correspond to respective operating transmission frequency allocation configurations for the plurality of cells (block 640). For example, the device (e.g., using computing resource 224, processor 320, memory 330, storage component 340, input component 350, output component 360, communication interface 370 and/or the like) may determine, using a quantum solver, one or more minimum energy states of the constraint model, as described above. In some implementations, the one or more minimum energy states correspond to respective operating transmission frequency allocation configurations for the plurality of cells.

As further shown in FIG. 6, process 600 may include assigning, based on an operating transmission frequency allocation corresponding to a minimum energy state of the one or more minimum energy states, operating transmission frequencies to the plurality of cells (block 650). For example, the device (e.g., using computing resource 224, processor 320, memory 330, storage component 340, input component 350, output component 360, communication interface 370 and/or the like) may assign, based on an operating transmission frequency allocation corresponding to a minimum energy state of the one or more minimum energy states, operating transmission frequencies to the plurality of cells, as described above.

Process 600 may include additional implementations, such as any single implementation or any combination of implementations described below and/or in connection with one or more other processes described elsewhere herein.

In some implementations, generating the constraint model comprises generating a QUBO of the hypergraph, converting the QUBO to an incidence matrix, and generating the constraint model based on the incidence matrix and the one or more parameters. In some implementations, generating the constraint model based on the incidence matrix and the one or more parameters comprises generating a constraint matrix based on the one or more parameters and generating the constraint model based on the incidence matrix and the constraint matrix.

In some implementations, process 600 further comprises generating, for display in a user interface, a visualization of an operating transmission frequency allocation configuration corresponding to the minimum energy state, wherein respective operating transmission frequencies, of the operating transmission frequencies assigned to the plurality of cells, are indicated in the visualization by at least one of respective colors, respective shading patterns, respective amounts of shading, or respective shapes. In some implementations, assigning operating transmission frequencies to the plurality of cells comprises configuring the plurality of cells to operate using operating transmission frequencies based on the operating transmission frequency allocation configuration corresponding to the minimum energy state. In some implementations, the plurality of cells comprises a plurality of small cells.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, communicatively coupled to the one or more memories, to:
   provide a user interface for network management;
   select, via the user interface, a plurality of cells included in a particular network,
      the plurality of cells being selected based on at least one of:
         a particular geographic area,
         cell type, or
         detecting or determining interference between the plurality of cells;
   generate a quadratic unconstrained binary optimization (QUBO) of a hypergraph for the plurality of cells included in a communications network,
      wherein the plurality of cells correspond to a plurality of vertices of the hypergraph, and
      wherein one or more cumulative transmission interference regions, associated with the plurality of cells, correspond to one or more hyperedges of the hypergraph;
   convert the QUBO to an incidence matrix;
   identify one or more parameters for allocating operating transmission frequencies to the plurality of cells;
   generate a constraint model based on the incidence matrix and the one or more parameters,
      wherein the constraint model includes a binary quadratic model;
   determine, using a quantum solver, one or more minimum energy states of the constraint model,
      wherein the one or more minimum energy states correspond to respective operating transmission frequency allocation configurations for the plurality of cells,
      wherein a hypergraph coloring operation is performed to determine the minimum energy state of the one or more minimum energy states, and
      wherein the binary quadratic model includes a model of the QUBO of the hypergraph that is constrained by the one or more parameters specified for the hypergraph coloring operation;
   assign, based on an operating transmission frequency allocation corresponding to the minimum energy state, the operating transmission frequencies to the plurality of cells,
      wherein an output of the hypergraph coloring operation corresponds to an operating transmission frequency allocation configuration, for the plurality of cells, that results in the minimum energy state,
wherein the minimum energy state includes a hypergraph coloring configuration that results in a lowest value output from the constraint model; and
provide, via the user interface, a visual display of the operating transmission frequencies assigned to the plurality of cells,
the user interface providing an ability to analyze a hypothetical deployment of the plurality of cells.

2. The device of claim 1, wherein the one or more parameters comprise at least one of:
a parameter specifying a maximum quantity of operating transmission frequencies that are permitted to be assigned to the plurality of cells,
a parameter specifying that each cell, of the plurality of cells, is to be assigned an operating transmission frequency, or
a parameter specifying that no more than one cell included in a hyperedge, of the one or more hyperedges, is to be assigned a particular operating transmission frequency.

3. The device of claim 1, wherein the one or more processors, when generating the constraint model, are to:
generate a constraint matrix based on the one or more parameters; and
generate the constraint model based on the hypergraph and the constraint matrix.

4. The device of claim 1, wherein the one or more processors, when performing the hypergraph coloring operation, are to:
assign a plurality of colors to the plurality of cells such that no more than one cell included in a hyperedge, of the one or more hyperedges, is to be assigned a particular color,
wherein the plurality of colors correspond to respective operating transmission frequencies.

5. The device of claim 1, wherein the one or more processors, when assigning the operating transmission frequencies to the plurality of cells, are to:
assign the operating transmission frequencies to the plurality of cells using a hardware quantum processing unit.

6. The device of claim 1, wherein the plurality of cells comprise:
a plurality of small cells configured to serve a geographic area having a 1-2 kilometer radius.

7. The device of claim 1, wherein the particular network is a fifth generation (5G) network/New Radio (NR) communications network.

8. A method, comprising:
providing, by a device, a user interface for network management;
selecting, by the device and via the user interface, a plurality of cells included in a particular network,
the plurality of cells being selected based on at least one of:
a particular geographic area,
cell type, or
detecting or determining interface between the plurality of cells
generating, by the device, a quadratic unconstrained binary optimization (QUBO) of a hypergraph for the plurality of cells included in a communications network,
wherein the plurality of cells correspond to a plurality of vertices of the hypergraph, and
wherein one or more cumulative transmission interference regions, associated with the plurality of cells, correspond to one or more hyperedges of the hypergraph;
identifying, by the device, one or more parameters for assigning operating transmission frequencies to the plurality of cells;
converting, by the device, the QUBO to an incidence matrix;
generating, by the device, a constraint model based on the incidence matrix and the one or more parameters,
wherein the constraint model includes a binary quadratic model;
providing, by the device and via an application programming interface (API), the constraint model to a quantum solver;
determining, by the device and using the quantum solver, a minimum energy state, of one or more minimum energy states, of the constraint model,
wherein the minimum energy state corresponds to an operating transmission frequency allocation configuration for the plurality of cells,
wherein a hypergraph coloring operation is performed to determine the minimum energy state,
wherein the binary quadratic model includes a model of the QUBO of the hypergraph that is constrained by the one or more parameters specified for the hypergraph coloring operation, and
wherein the minimum energy state includes a minimum quantity of operating transmission frequencies required to configure the plurality of cells such that no more than one cell included in a hyperedge, of the one or more hyperedges, is assigned a particular operating transmission frequency;
assigning, by the device, the operating transmission frequencies to the plurality of cells based on the operating transmission frequency allocation configuration corresponding to the minimum energy state,
wherein an output of the hypergraph coloring operation corresponds to an operating transmission frequency allocation configuration, for the plurality of cells, that results in the minimum energy state,
wherein the minimum energy state includes a hypergraph coloring configuration that results in a lowest value output from the constraint model; and
provide, via the user interface, a visual display of the operating transmission frequencies assigned to the plurality of cells,
the user interface providing an ability to analyze a hypothetical deployment of the plurality of cells.

9. The method of claim 8, wherein respective operating transmission frequencies, of the operating transmission frequencies assigned to the plurality of cells, are indicated in the visual display by at least one of:
respective colors,
respective shading patterns,
respective amounts of shading, or
respective shapes.

10. The method of claim 8, wherein determining the minimum energy state of the constraint model comprises:
determining that the operating transmission frequency allocation configuration, based on the minimum quantity of operating transmission frequencies, results in a zero output value for the constraint model.

11. The method of claim 8, wherein determining the minimum energy state of the constraint model comprises:

determining that the operating transmission frequency allocation configuration satisfies the one or more parameters.

12. The method of claim 8, wherein the one or more parameters comprise at least one of:
    location data associated with the plurality of cells, or
    transmission range data associated with the plurality of cells.

13. The method of claim 12, further comprising:
    determining the one or more cumulative transmission interference regions based on the one or more parameters.

14. The method of claim 8, wherein assigning the operating transmission frequencies to the plurality of cells includes:
    assigning the operating transmission frequencies to the plurality of cells using a hardware quantum processing unit.

15. A non-transitory computer-readable medium storing instructions, the instructions comprising:
    one or more instructions that, when executed by one or more processors, cause the one or more processors to:
        provide a user interface for network management;
        select, via the user interface, a plurality of cells included in a particular network,
            the plurality of cells being selected based on at least one of:
                a particular geographic area,
                cell type, or
                detecting or determining interface between the plurality of cells
        generate a quadratic unconstrained binary optimization (QUBO) of a hypergraph for the plurality of cells included in a communications network,
            wherein the plurality of cells correspond to a plurality of vertices of the hypergraph,
            wherein one or more cumulative transmission interference regions, associated with the plurality of cells, correspond to one or more hyperedges of the hypergraph, and
            wherein at least a subset of the plurality of cells are included in at least one hyperedge of the one or more hyperedges;
        identify one or more parameters for allocating operating transmission frequencies to the plurality of cells;
        convert the QUBO to an incidence matrix;
        generate a constraint model based on the incidence matrix and the one or more parameters,
            wherein the constraint model includes a binary quadratic model;
        determine, using a quantum solver, one or more minimum energy states of the constraint model,
            wherein the one or more minimum energy states correspond to respective operating transmission frequency allocation configurations for the plurality of cells,
            wherein a hypergraph coloring operation is performed to determine a minimum energy state of the one or more minimum energy states, and
            wherein the binary quadratic model includes a model of the QUBO of the hypergraph that is constrained by the one or more parameters specified for the hypergraph coloring operation;
        assign, based on an operating transmission frequency allocation corresponding to a minimum energy state, the operating transmission frequencies to the plurality of cells,
            wherein an output of the hypergraph coloring operation corresponds to an operating transmission frequency allocation configuration, for the plurality of cells, that results in the minimum energy state,
            wherein the minimum energy state includes a hypergraph coloring configuration that results in a lowest value output from the constraint model; and
        provide, via the user interface, a visual display of the operating transmission frequencies assigned to the plurality of cells,
            the user interface providing an ability to analyze a hypothetical deployment of the plurality of cells.

16. The non-transitory computer-readable medium of claim 15, wherein the one or more instructions, that cause the one or more processors to generate the constraint model based on the incidence matrix and the one or more parameters, cause the one or more processors to:
    generate a constraint matrix based on the one or more parameters; and
    generate the constraint model based on the incidence matrix and the constraint matrix.

17. The non-transitory computer-readable medium of claim 15,
    wherein respective operating transmission frequencies, of the operating transmission frequencies assigned to the plurality of cells, are indicated in the visual display by at least one of:
        respective colors,
        respective shading patterns,
        respective amounts of shading, or
        respective shapes.

18. The non-transitory computer-readable medium of claim 15, wherein the plurality of cells comprises:
    a plurality of small cells.

19. The non-transitory computer-readable medium of claim 15, wherein the one or more instructions, that cause the one or more processors to assign the operating transmission frequencies to the plurality of cells, cause the one or more processors to:
    assign the operating transmission frequencies to the plurality of cells using a hardware quantum processing unit.

20. The non-transitory computer-readable medium of claim 15, wherein the plurality of cells comprise:
    a plurality of small cells configured to serve a geographic area having a 1-2 kilometer radius.

* * * * *